US010964086B2

(12) United States Patent
Croxford et al.

(10) Patent No.: US 10,964,086 B2
(45) Date of Patent: Mar. 30, 2021

(54) GRAPHICS PROCESSING

(71) Applicants: Arm Limited, Cambridge (GB); Apical Limited, Cambridge (GB)

(72) Inventors: Daren Croxford, Swaffham Prior (GB); Mathieu Jean Joseph Robart, Papworth Everard (GB)

(73) Assignees: Apical Limited, Cambridge (GB); Arm Limited, Cambridge (GB)

(*) Notice: Subject to any disclaimer, the term of this patent is extended or adjusted under 35 U.S.C. 154(b) by 0 days.

(21) Appl. No.: 16/552,595

(22) Filed: Aug. 27, 2019

(65) Prior Publication Data
US 2021/0065422 A1 Mar. 4, 2021

(51) Int. Cl.
*G06T 15/40* (2011.01)
*G06T 15/00* (2011.01)
*G06T 15/20* (2011.01)
*G06T 15/06* (2011.01)

(52) U.S. Cl.
CPC ............ *G06T 15/005* (2013.01); *G06T 15/06* (2013.01); *G06T 15/20* (2013.01); *G06T 15/40* (2013.01)

(58) Field of Classification Search
CPC ........ G06T 15/005; G06T 15/06; G06T 15/20
USPC ......................................................... 345/421
See application file for complete search history.

(56) References Cited

U.S. PATENT DOCUMENTS

| | | | |
|---|---|---|---|
| 2015/0091894 A1* | 4/2015 | Shin | G06T 15/06 345/419 |
| 2018/0096516 A1* | 4/2018 | Luebke | G06T 15/06 |
| 2020/0184707 A1* | 6/2020 | Croxford | G06T 15/005 |

* cited by examiner

*Primary Examiner* — Thomas J Lett
(74) *Attorney, Agent, or Firm* — Vierra Magen Marcus LLP

(57) ABSTRACT

When rendering a new frame using a hybrid ray tracing process, a graphics processor transforms vertex position data for models representing objects in the new frame into camera space for use in a rasterisation process of the hybrid ray tracing process irrespective of whether the object has moved between frames or whether the geometry of the model representing object has changed, but only transforms vertex position data for a model for an object into world space for use in a ray tracing process of the hybrid ray tracing process when the object has moved between frames or where the geometry of the model representing the object has changed.

14 Claims, 18 Drawing Sheets

GRAPHICS PROCESSING

BACKGROUND

The technology described herein relates to graphics processing, and particularly, although not exclusively, to the operation of graphics processors that can execute "shader" programs to perform graphic processing operations.

FIG. 1 shows an exemplary system on chip (SoC) graphics processing system 8 that comprises a host processor comprising a central processing unit (CPU) 1, a graphics processor (GPU) 2, a display processor 3, and a memory controller 5. The exemplary data processing system may also comprise a video engine (not shown in FIG. 1). As shown in FIG. 1, these units communicate via an interconnect 4 and have access to off-chip memory 6. In this system, the graphics processor 2 will render frames (images) to be displayed, and the display processor 3 will then provide the frames to a display panel 7 for display.

In use of this system, an application 13 such as a game, executing on the host processor (CPU) 1 will, for example, require the display of frames on the display panel 7. To do this, the application will submit appropriate commands and data to a driver 11 for the graphics processor 2 that is executing on the CPU 1. The driver 11 will then generate appropriate commands and data to cause the graphics processor 2 to render appropriate frames for display and to store those frames in appropriate frame buffers, e.g. in the main memory 6. The display processor 3 will then read those frames into a buffer for the display from where they are then read out and displayed on the display panel 7 of the display.

Graphics processing is typically carried out in a pipelined fashion, with one or more pipeline stages operating on the data to generate the final render output, e.g. frame that is displayed. Graphics processing is normally carried out by first dividing the output to be generated, such as a frame to be displayed, into a number of similar basic components (so-called "primitives") to allow the graphics processing operations to be more easily carried out. These "primitives" are usually in the form of simple polygons, such as triangles.

Once the primitives have been generated and defined, they can be processed by the graphics processing system, in order, e.g., to display the frame.

In one graphics processing technique, this process basically involves determining which sampling positions in an array of sampling positions covering the output area to be processed are covered by a primitive, and then determining the appearance each sampling position should have (e.g. in terms of its colour, etc.) to represent the primitive at that sampling position. These processes are commonly referred to as rasterising and rendering, respectively.

The rasterising process determines the sample positions that should be used for a primitive (i.e. (the x, y) positions of the sample points to be used to represent the primitive in the output (e.g. frame to be displayed)).

The rendering process then derives the data, such as red, green and blue (RGB) colour values and an "alpha" (transparency) value, necessary to represent the primitive at the sample points (i.e. "shades" each sample point). This can involve applying textures, blending sample point data values, etc.

These processes are typically carried out by testing sets of one, or of more than one, sampling position, and then generating, for each set of sampling positions found to include a sample point that is inside (covered by) the primitive in question (being tested), a discrete graphical entity, which may be referred to as a "fragment", on which the graphics processing operations (such as rendering) are carried out. Covered sampling positions are thus, in effect, processed as fragments that will be used to render the primitive at the sampling positions in question. The fragments are the graphical entities that pass through the rendering process (the rendering pipeline). Each fragment that is generated and processed may, e.g., represent a single sampling position or a set of plural sampling positions, depending upon how the graphics processing system is configured.

Many graphics processing pipelines now include one or more programmable processing stages, commonly referred to as "shaders". These shaders are programmable processing stages that execute shader programs on input data values to generate a desired set of output data for processing by the rest of the graphics pipeline and/or for output. The shaders of the graphics processing pipeline may share programmable processing circuitry, or they may each be distinct programmable processing units.

For example, in a typical graphics processing pipeline, shaders may be used to provide one or more of, and typically all of: geometry shading, vertex shading and fragment (pixel) shading by executing appropriate shader programs.

A graphics processor (GPU) shader core is thus a programmable processing unit (circuit) that performs processing operations by running small programs for each "item" in an output to be generated such as a render target, e.g. frame. An "item" in this regard may be, e.g. a vertex, a fragment (e.g. a pixel), one or more sampling positions, etc.

In graphics shader operation, each "item" will be processed by means of one or more execution threads which will execute the instructions of the shader program in question for the "item" in question. Typically, there will be multiple execution threads each executing at the same time (in parallel).

A shader program to be executed by a given "shader" of a graphics processing pipeline will typically be provided by an application that requires the graphics processing operations using a high level shader programming language, such as GLSL, HLSL, OpenCL and Vulkan SL, etc. This shader program will typically consist of high level instructions indicating desired programming steps defined in the relevant language standards (specifications). The high level shader program is then translated by a shader language compiler to binary code for the target graphics processing pipeline. This binary code will consist of "instructions" which are specified in the instruction set specification for the given target graphics processing pipeline.

In addition to rasterisation, another graphics processing technique that may be performed by a graphics processor is so-called "ray tracing". Ray tracing is a rendering process which involves tracing the paths of rays of light from a viewpoint (sometimes referred to as a "camera") back through pixels in an image plane into a scene, and simulating the effect of the interaction between the rays and objects in the scene. The output data value e.g. colour of a pixel in the image plane is determined based on the object(s) in the scene intersected by the ray passing through the pixel, and the properties of the surfaces of those objects. The ray tracing calculation is complex, and involves determining, for each pixel, a set of objects within the scene which a ray passing through the pixel intersects.

Ray tracing is considered to provide better i.e. more realistic, physically accurate images than rasterisation rendering techniques, particularly in terms of the ability to capture reflection, refraction and lighting effects. However, ray tracing can be significantly more processing intensive than rasterisation.

In some cases, rendering may be carried out using a so-called "hybrid" ray tracing process, in which only some of the steps of a full ray tracing process are performed. For example, the first intersection of each ray with an object in the scene may be determined through rasterisation (rather than by casting a ray from the viewpoint into the scene), with the remainder of the process then being performed in the same manner as when carrying out "full" ray tracing. Thus, a hybrid ray tracing process includes both rasterisation and ray tracing processes.

Thus, a frame to be rendered e.g. using hybrid ray tracing process, will represent a view of a scene containing one or more objects. An "object" in this case may be any object in the scene, such as a car, tree, house, etc. Objects in the scene will correspondingly be represented by appropriate "models", which are then processed to render the objects to display the scene. There may be a separate model for each object in a scene, or some models may represent groups of plural objects, if desired. Equally if the same (base) object (such as a tree) appears multiple times in a scene, the same (base) model may be used for each separate "instance" of the object in question in the scene (thus there may be multiple instances of the same model for a scene (frame) being rendered). Each model will represent the corresponding object, and thus have defined for it, e.g. appropriate geometry, such as a set of one or more vertices, in a model space, representing the location of the object in question in the model space.

Thus, when performing rendering of a new frame in a sequence of frames using a hybrid ray tracing process, the new frame will be defined as comprising one or more models representing objects in the scene, with each model having associated data indicative of the position of vertices ("vertex position data") of the model defined in a "model" space. The vertex position data for the model(s) for the object(s) for the frame must then be transformed into both a camera space to enable the rasterisation part of the hybrid ray tracing process to be performed and to a world space to enable the ray tracing part of the hybrid ray tracing process to be performed. These transformations are typically performed by executing an appropriate shading program (e.g. a vertex shader).

The Applicant has realised that there is scope for improvement in providing vertex position data in respect of objects in a scene for use when rendering frames using hybrid ray tracing processes.

BRIEF DESCRIPTION OF THE DRAWINGS

Embodiments of the technology described herein will now be described by way of example only and with reference to the accompanying drawings, in which.

Like reference numerals are used for like components where appropriate in the drawings.

DETAILED DESCRIPTION

Figure 1:
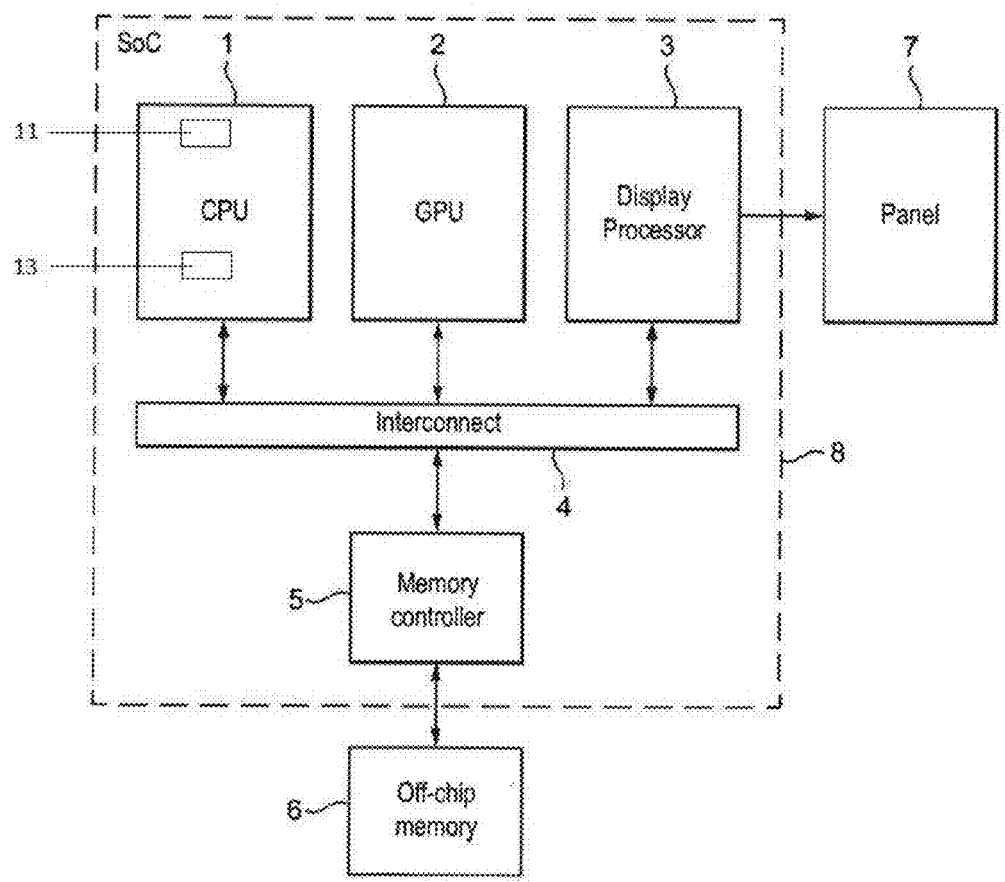
FIG. 1 shows an exemplary data processing system in which the technology described herein may be implemented.

A first embodiment of the technology described herein provides a method of operating a graphics processing system when rendering a new frame in a sequence of frames to be rendered in which each frame represents a view of a scene comprising one or more objects and is defined as including one or more models defining objects in the scene, and in which each frame is rendered using a hybrid ray tracing process that uses both rasterisation and ray tracing processes, and in which each model for a frame to be rendered is defined in a model space, and the vertex position data relating to the model defined in the model space is transformed to a camera space with respect to a viewpoint for use in a rasterisation process of the hybrid ray tracing process and to a world space for use in a ray tracing process of the hybrid ray tracing process;

the graphics processing system comprising a graphics processor comprising a programmable execution unit configured to perform vertex shading operations on vertex attribute data including vertex position data for vertices relating to models for a frame to be rendered;

the method comprising:

when an object to be rendered for the new frame has not moved relative to a previous frame and when the geometry of the model representing the object has not changed relative to the previous frame:
  generating a first shading program which, when executed by the programmable execution unit, causes a first vertex shading operation to be performed, the first vertex shading operation transforming position data for vertices relating to the model representing the object from model space to camera space for use in a rasterisation process of the hybrid ray tracing rendering process;
  providing the generated first shading program to the programmable execution unit for execution by the programmable execution unit; and
  the programmable execution unit executing the first shading program to transform position data for the vertices relating to the model representing the object from modelspace to camera space for use in a rasterisation process of the hybrid ray tracing rendering process when rendering the new frame;
when an object to be rendered for the new frame has moved relative to a previous frame or the geometry of the model representing the object has changed relative to the previous frame:
  generating a second shading program which, when executed by the programmable execution unit, causes a second vertex shading operation to be performed, the second vertex shading operation transforming position data for vertices relating to the model representing the object from model space both to a camera space for use in a rasterisation process of the hybrid ray tracing rendering process and to a world space for use in a ray tracing process of the hybrid ray tracing rendering process;
  providing the generated second shading program to the programmable execution unit for execution by the programmable execution unit; and
  the programmable execution unit executing the second shading program to transform position data for vertices relating to the model representing the object from model space both to a camera space for use in a rasterisation process of the hybrid ray tracing rendering process and to a world space for use in a ray tracing process of the hybrid ray tracing rendering process when rendering the new frame.

A second embodiment of the technology described herein provides a graphics processing system operable to render frames in a sequence of frames to be rendered in which each frame represents a view of a scene comprising one or more objects and is defined as including one or more models defining objects in the scene, and in which each frame is rendered using a hybrid ray tracing process that uses both rasterisation and ray tracing processes, and in which each model for a frame to be rendered is defined in a model space, and the vertex position data relating to the model defined in the model space is transformed to a camera space with respect to a viewpoint for use in a rasterisation process of the hybrid ray tracing process and to a world space for use in a ray tracing process of the hybrid ray tracing process;
the graphics processing system comprising:
a graphics processor comprising a programmable execution unit configured to perform vertex shading operations on vertex attribute data including vertex position data for vertices relating to models for a frame to be rendered;
the graphics processing system further comprising:
a processing circuit configured to:
  when an object to be rendered for a new frame has not moved relative to a previous frame and when the geometry of the model representing the object has not changed relative to the previous frame:
    generate a first shading program which, when executed by the programmable execution unit, causes a first vertex shading operation to be performed, the first vertex shading operation transforming position data for vertices relating to the model representing the object from model space to camera space for use in a rasterisation process of the hybrid ray tracing rendering process; and
  when an object to be rendered for a new frame has moved relative to a previous frame or the geometry of the model representing the object has changed relative to the previous frame:
    generate a second shading program which, when executed by the programmable execution unit, causes a second vertex shading operation to be performed, the second vertex shading operation transforming position data for vertices relating to the model representing the object from model space both to a camera space for use in a rasterisation process of the hybrid ray tracing rendering process and to a world space for use in a ray tracing process of the hybrid ray tracing rendering process;
  and to:
  provide the generated first or second shading program to the programmable execution unit for execution by the programmable execution unit; and
the programmable execution unit is configured to:
execute the provided first shading program to transform position data for the vertices relating to the model representing the object from model space to camera space for use in a rasterisation process of the hybrid ray tracing rendering process when rendering the new frame, or the provided second shading program to transform position data for vertices relating to the model representing the object from model space both to a camera space for use in a rasterisation process of the hybrid ray tracing rendering process and to a world space for use in a ray tracing process of the hybrid ray tracing rendering process when rendering the new frame. The technology described herein is directed to methods of and systems for providing vertex position data in respect of vertices of models representing object(s) in a new frame to be rendered when performing hybrid ray tracing.

When performing hybrid ray tracing, both rasterisation and ray tracing processes are performed.

Initially, vertex position data relating to models representing objects for a frame (representing a scene) to be rendered is defined in a model space. Rasterisation and ray tracing techniques require this vertex position data in model space to be transformed into different forms upon which the respective technique may then operate. In the case of rasterisation, the vertex position data must be converted from the model space to camera space (such camera space being defined with respect to a viewpoint), while in the case of ray tracing, the vertex position data needs, instead, to be converted to world space. It will be appreciated that, when performing hybrid ray tracing, vertex position data relating to models in model space must therefore be transformed both to camera space and world space for use in the rasterisation and ray tracing processes of a hybrid ray tracing process respectively. The transformed data may be used to provide appropriate initial data structures used to perform the rasterisation or ray tracing process as appropriate.

The model space, world space and camera space are each 3-D spaces. Camera space is defined with respect to a viewpoint, which may be referred to as a "camera". In camera space, the models are projected onto a flat plane. However, each point of the model in the projection on the plane will be associated with a depth (relative to the viewpoint). Thus, vertices of a model in camera space will include a Z co-ordinate indicating how close the applicable point of the model is to the viewpoint.

The Applicant has recognised that while the transformation of vertex position data from model space to camera space for use in rasterisation usually needs to be performed in respect of each frame, the transformation of vertex position data from model space to world space need only be (re)done in the event that an object (and thus its model) moves between frames, or where the geometry of the model representing the object has changed between frames. Thus, if an object remains stationary between frames, and the geometry of the model (object) does not change, it is possible to perform the transformation of the vertex position data for the model to world space for use in performing ray tracing less frequently.

In accordance with the technology described herein, when rendering a new frame in a sequence of frames to be rendered, a first or second shading program is generated conditionally for transforming vertex position data in respect of a model representing an object in a frame dependent upon whether the object has moved between frames or whether the geometry of the model for the object has changed between frames. If the object has not moved between frames, and the geometry of the model representing the object has not changed, a first shading program is generated and executed, transforming vertex position data for the model from model space to camera space for use in a rasterisation process of the hybrid ray tracing process, while if the object has moved between frames, or if the geometry of the model has changed between frames, a second shading program is generated and executed, transforming position data for the model from model space both to camera space for use in a rasterisation process of the hybrid ray tracing rendering process and to a world space for use in a ray tracing process of the hybrid ray tracing rendering process. This may enable the vertex shaded position data required for hybrid ray tracing to be generated in a more efficient manner.

The programmable execution unit is therefore caused to execute a first shading program or a second shading program for providing vertex position data relating to a model for an object in the scene depending upon whether the object has moved between frames, or whether the geometry of the model for the object has changed between frames.

It will be appreciated that there may be multiple instances of a particular object (and thus the corresponding model) in a given frame. The method of the technology described herein in any of its embodiments may then be performed in respect of each such instance of an object/model.

The first and second shading programs that are generated and executed in the technology described herein may each be any type of shading program which transforms vertex position data between the specified spaces (domains). In some embodiments the first and second shading programs may be vertex shading programs. However, other types of shading program, such as geometry shading programs, may also or instead be used, if desired.

The shading programs may transform position data for vertices of models from one space to another in a one-to-one type manner as part of their operation, such that there is a one-to-one relationship between the input geometry and the output geometry. However, it is not necessary that the shading programs provide a one-to-one mapping between input and output geometry. For example, the shading programs may output vertex data that includes a different e.g. greater number of vertices than the input vertex data as part of their operation (e.g. as may particularly be the case for "geometry shading" programs).

Thus, while the shading programs are primarily described herein in the context of vertex shading programs, it should be understood that the shader programs are not limited to this type of shader program, and encompass any shader program which provides a transformation of vertex position data between spaces as defined herein as part of its operation.

The first and second shading programs may be generated in any suitable and desired manner. In an embodiment, they are generated by the compiler (the shader compiler) for the graphics processor of the graphics processing system in question (and thus, in an embodiment, the processing circuit that generates the first and second shading programs comprises an appropriate compiler circuit). The compiler is, in an embodiment, executed on an appropriate programmable processing circuit of the graphics processing system.

The compiler (the compiler processing circuit) is, in an embodiment, part of and, in an embodiment, executes on a central processing unit (CPU), such as a host processor, of the graphics processing system, and is part of a driver for the graphics processor that is executing on the CPU (e.g. host processor).

The compiler in an embodiment runs on a host processor of the overall graphics processing system that includes the graphics processor (i.e. such that the shading programs are then executed on a graphics processor that is associated with, but separate to, the host processor (CPU) on which the compiler runs). In this case, the compiler and compiled code would run on separate processors within the overall graphics processing system. However, other arrangements would be possible, such as the compiler running on the same processor as the compiled code, if desired.

The compilation process (the compiler) can generate the first and second shading programs in any suitable and desired manner, e.g., and, in an embodiment, using any suitable and desired compiler techniques for that purpose.

Where a common shading program will be used for all models for a frame (and for plural frames, for example), then the compiler may operate to generate a first and second shading program when a first object is determined to have moved between frames, or where the geometry of the model for a first object has changed between frames, but thereafter simply to select the appropriate ones of those shading programs for any further objects (or instances of objects) within the same frame and/or for other, subsequent frames. It is envisaged that different shading programs may be used for different frames. Shading programs for subsequent frames may then generated as described herein, based on whether objects in a frame have moved, or the geometry of the models for the objects have changed.

Other arrangements would, of course, be possible.

The first and second shading programs will each comprise an appropriate set of one or more instructions that when executed will perform the desired vertex shading operation. The first and second shading programs may include only instructions necessary for performing the particular vertex shading operations, or they may also include other instructions, e.g. to perform other vertex shading operations, if desired.

The technology described herein also extends to and includes the operation of the compiler itself.

Thus, a further embodiment of the technology described herein provides a method of compiling a shading program to be executed by a programmable execution unit of a graphics processor when rendering a new frame in a sequence of frames to be rendered in which each frame represents a view of a scene comprising one or more objects and is defined as including one or more models defining objects in the scene, and in which each frame is rendered using a hybrid ray tracing process that uses both rasterisation and ray tracing processes, and in which each model for a frame to be rendered is defined in a model space, and the vertex position data relating to the model defined in the model space is transformed to a camera space with respect to a viewpoint for use in a rasterisation process of the hybrid ray tracing process and to a world space for use in a ray tracing process of the hybrid ray tracing process;

the method comprising:

when an object to be rendered for a new frame has not moved relative to a previous frame and when the geometry of the model representing the object has not changed relative to the previous frame:

generating a first shading program which, when executed by a programmable execution unit of a graphics processor, causes a first vertex shading operation to be performed, the first vertex shading operation transforming position data for vertices relating to the model representing the object from model space to camera space for use in a rasterisation process of a hybrid ray tracing rendering process;

and when an object to be rendered for a new frame has moved relative to a previous frame or the geometry of the model representing the object has changed relative to the previous frame:

generating a second shading program which, when executed by a programmable execution unit of a graphics processor, causes a second vertex shading operation to be performed, the second vertex shading operation transforming position data for vertices relating to the model representing the object from model space both to a camera space for use in a rasterisation process of a hybrid ray tracing rendering process and to a world space for use in a ray tracing process of the hybrid ray tracing rendering process.

As will be appreciated by those skilled in the art, these embodiments of the technology described herein can, and, in an embodiment do, include any one or more or all of the optional features of the technology described herein described herein, as appropriate.

The first shading program that is generated and executed in the case where an object has not moved between frames or where the geometry of the model for the object has not changed between frames, is operable to, and configured to, transform position data for the vertices relating to the model for the object from model space to camera space for use in a rasterisation process when executed by an appropriate programmable execution unit of the graphics processor.

This first shading program does not need to, and, in an embodiment, does not operate to (and accordingly does not include any instructions to), transform the position data for the vertices from model space to world space for use in the ray tracing process. Thus, the first shading program should, and, in an embodiment, does, only transform position data for the vertices relating to the model from model space to camera space for use in a rasterisation process, but does not (does other than) transform the position data for the vertices from model space to world space for use in a ray tracing process.

Accordingly, the output of executing the first shading program will be transformed position data for the vertices relating to the model for the object in the camera space, but that shader program will not output any transformed position data for the vertices in the world space. In this case therefore, the transformed position data for the vertices for the model in the world space that are used in the ray tracing process (if required) should, and, in an embodiment, do, comprise transformed position data for those vertices (for the model (object)) that has previously been generated for the model and object in question, e.g., and, in an embodiment, in relation to a previous frame containing the object.

In other words, in the case where an object has not moved between frames, and the geometry of the model for the object has not changed, the transformed position data for the object in the camera space is generated by executing the first shading program, but previously generated (e.g. in relation to a previous frame) transformed position data for the model for the object in the world space is used in the ray tracing process for the new frame.

On the other hand, the second shading program that is generated and executed when an object has been found to have moved between frames or where the geometry of the model for the object is found to have changed between frames is operable to and configured to (when executed) transform position data for the vertices relating to the model for the object from model space to both world space and camera space. In this case therefore, executing the second shading program would generate (new) transformed position data for the model for the object in both the camera space for use in the rasterisation process and in the world space for use in the ray tracing process.

In this case therefore, an object that has moved between frames will have new transformed position data generated for it for the new frame (rather than reusing transformed position data, at least in the world space, from a previous frame).

The second shading program should, and, in an embodiment, does, provide an appropriate sequence of instructions for performing the required transformations (and will accordingly comprise a different sequence of instructions to the first shading program).

The second shading program may be configured to (e.g. comprise a separate sequence of instructions for) transform the vertex position data from model space to camera space for use in the rasterisation process independently of, and separately to, transforming the vertex position data from model space to world space for use in the ray tracing process.

However, in an embodiment, the second shading program is configured to transform the vertex position data from model space to camera space via world space. Thus the second shading program is, in an embodiment, operable to (and, in an embodiment, comprises a sequence of instructions configured to) transform the position data for the vertices of the model for the object from model space to world space, and to output the transformed position data in world space for use in the ray tracing process, and to then further transform the transformed position data in world space to camera space, and to output the further transformed position data in world space for use in the rasterisation process.

The first or second shading programs are generated and executed in dependence upon whether an object for a frame being rendered has moved, or the geometry of the model for the object has changed, relative to a previous frame.

Whether an object has moved or not can be determined in any suitable and desired manner. In an embodiment the driver for the graphics processor determines whether an object moves between frames and then provides that "movement" information to the vertex shader generation process, e.g., compiler.

For example, the driver may already have knowledge of whether an object moves between frames, as such information may be provided by the application requiring the graphics processing and/or that may otherwise be determined by the driver, e.g. for use in implementing other parts of the rendering process, or for other reasons.

Thus, in an embodiment, the method extends to the step of determining (and the system includes a processing circuit configured to determine) whether the object has moved between frames, with the result of this determination then being used to control the vertex shader generating process.

This determination may, e.g., and in an embodiment, be based on information provided by the application requiring the graphics processing, and/or otherwise determined by the driver, e.g. for use in implementing other parts of the rendering process, or for other reasons, and/or may comprise performing some form of detecting of whether an object has moved between frames.

Where the actual detection movement of an object between frames is performed, this may be carried out as desired, e.g. using motion vectors associated with the object.

For example, the process, e.g. driver, may be operable to perform some form of analysis to determine whether an object has moved between frames, for example based on motion vectors associated with an object.

A change in the geometry of a model representing an object as referred to herein may e.g., be a change in vertex and/or primitive data relating to the model. Where an object changes between frames e.g. a car crashes, the geometry of the model representing the object may need to change in order to appropriately model the changed object. For example, the object may change in appearance and/or shape, necessitating a change in the geometry of the model representing the object. Shadows or reflections may need to be introduced to the object. Thus, there may be a change in the geometry of a model representing an object between frames. The geometry of a model for an object may also change where a different vertex or geometry shading program is used from frame to frame. The different shading programs may process the geometry of the model differently. For example, the geometry may be extruded. Where a more complex shader program is used, such a program may generate different geometry for a model for different frames.

Whether the geometry of a model for an object has changed or not can be determined in any suitable and desired manner. In an embodiment the driver for the graphics processor determines whether the geometry of the model for an object changes between frames and then provides that "change" information to the vertex shader generation process, e.g., compiler.

For example, the driver be able to analyse the shading program being used, and determine what effect it will have on the geometry of models (objects). The driver may also have knowledge of whether different shader programs are being used from one frame to another.

Thus, in an embodiment, the method extends to the step of determining (and the system includes a processing circuit configured to determine) whether the geometry of a model for an object has changed between frames, with the result of this determination then being used to control the vertex shader generating process.

This determination may, e.g., and, in an embodiment, be based on information provided by the application requiring the graphics processing, and/or otherwise determined by the driver, e.g. for use in implementing other parts of the rendering process, or for other reasons, and/or may comprise performing some form of detecting of whether the geometry of a model/object has changed between frames.

The operation in the manner of the technology described herein to determine whether an object has moved between frames, or whether the geometry of the model for the object has changed between frames, and, accordingly to generate the first or second shading program for the object in question should be, and is, in an embodiment, performed for plural, and, in an embodiment, for each, object in a frame (that was also present in a previous frame in the sequence of frames being rendered), and for each instance of each such object in the frame (that was also present in the previous frame).

The above operation of the technology described herein considers the situation where an object is present from frame to frame in a sequence of frames. It could also be the case that a new frame contains a new object that was not present in a previous frame. For example, a new object might appear in the scene represented by the new frame. A new object may also arise from a change or changes to an object appearing in a scene represented by the previous frame. This may occur where an object to be rendered has split into multiple pieces e.g. where an object, such as a car, has split into multiple pieces after a crash. One or more new models may then be defined in order to represent the resulting pieces. In cases where a new object appears, as there will not be any previously transformed position data available for the new object, the vertex position data for a model relating to any new object should be, and is, in an embodiment, transformed both to the camera space for use in a rasterisation process of the hybrid ray tracing rendering process, and to the world space for use in the ray tracing process of the hybrid ray tracing rendering process.

Thus, in an embodiment, the method of the technology described herein comprises (and the system of the technology described herein is correspondingly configured to) for a new object in a frame to be rendered, generate and execute the second shading program discussed above, i.e. which when executed will cause the second shading operation that transforms position data for vertices relating to the model for the object from model space both to a camera space for use in a rasterisation process of a hybrid ray tracing rendering process and to world space for use in a ray tracing process of the hybrid ray tracing rendering process, so as to accordingly provide both transformed camera space and transformed world space positions for the new object for use in the hybrid ray tracing rendering process.

Once the transformed position data for a model for a new object has been generated in this regard, if that object remains in (is present in) subsequent frames, then that new object can be treated in the manner of the technology described herein, namely to determine whether it has moved or not, and whether the geometry of the model for the object has changed or not, and to then generate and execute appropriate shading programs for the new object accordingly.

The vertex position data that is processed in accordance with the technology described herein in any of its embodiments may comprise coordinate data for the vertices. The coordinate data may comprise of (X, Y, Z, W) components for the vertices. The transformed coordinate data for a vertex may consist of a single set of coordinates, or, in the case of stereoscopic rendering, there could be two sets of coordinates output for a vertex, one being the vertex position as seen from the left eye and the other being the vertex position as seen from the right eye. In this case, there would typically be one coordinate data input, but two separate transforms (in the applicable vertex shading operation) on that one coordinate data input, thereby producing two coordinate data outputs.

The vertex shaded position data that is generated by the first or second shading operation as appropriate should be, and is, in an embodiment, stored appropriately for subsequent use by the graphics processor. It is in an embodiment stored in the normal manner for vertex shaded (positional) attributes in the graphics processing system (processor) in question.

The transformed vertex position data in camera space or world space is used as appropriate in the hybrid ray tracing process. Thus, transformed vertex position data in a camera space generated by the first or second vertex shading operation is in an embodiment used in a rasterisation process of the hybrid ray tracing rendering process, and the transformed vertex position data in a world space generated by the second vertex shading operation is in an embodiment used in a ray tracing process of the hybrid ray tracing rendering process. The data may be used in providing an initial data structure for use in the applicable rendering process. For example, the generated data in camera or world space may be used in generating primitives in camera space and/or world space respectively. It will be appreciated that as the vertex shaded position data in world space is only generated conditionally i.e. when it relates to an object that has moved or a model representing an object whose geometry has changed between frames, its subsequent use in generating a data structure will also be conditional.

The programmable execution unit is configured to perform vertex shading operations on vertex attribute data including vertex position data for vertices relating to each model representing an object in the frame to be rendered for use in the hybrid ray tracing rendering process. The first and second vertex shading operations as appropriate are performed in relation to vertex position data for vertices for the or each model representing an object in the new frame to be rendered. The first and second vertex shading operations may transform at least, and in an embodiment only, vertex attribute data in the form of vertex position data for the vertices for the model representing the object being processed. However, it may be desired to "vertex shade" other attributes of the vertices, such as so-called "varyings", such as colour, transparency, etc.

Where vertex-shaded attribute data in respect of at least one vertex attribute other than position for use in the ray tracing process is required, that vertex-shaded attribute data is in an embodiment generated in a non-conditional manner. In other words, such data is in an embodiment generated without first determining whether the vertex or vertices for the model representing the object should be processed further. On the other hand, where vertex-shaded attribute data in respect of at least one vertex attribute other than position for use in the rasterisation process is required, such vertex-shaded attribute data in respect of at least one vertex attribute other than position is in an embodiment generated in a conditional manner for the one or more vertices in question when generating vertex-shaded attribute data for use in the rasterisation process.

It has been recognised in this regard that not all the vertices for models representing objects defined for an e.g. draw call will in fact be used to generate the desired graphics output e.g. frame for display. This may occur e.g. when one or more vertices lie outside a view frustum, or is obscured by another object, or when one or more vertices belong (solely) to back facing primitives. The Applicant has recognised that vertex shading computations carried out for such "unused" vertices are ultimately redundant. By performing additional vertex shading in respect of the at least one vertex attribute other than position in a conditional manner when generating vertex-shaded attribute data for use in the rasterisation process, it is possible to avoid such redundant vertex shading operations. This is in an embodiment achieved by splitting the vertex shading for the rasterisation process into two stages, and conditionally executing the additional stage (only) for vertices that it is determined should be processed further (e.g. that are determined to be required to generate the graphics processing output). In this way, only a reduced set of vertex shading operations is performed for vertices that it can be determined will in fact be "unused".

Thus, in some embodiments the method comprises, for a vertex or vertices relating to a model representing an object having at least one attribute other than position;
  when generating vertex-shaded attribute data for use in the ray tracing process of the hybrid ray tracing process, performing additional vertex shading processing for at least one attribute other than position to generate vertex shaded attribute data for the vertex or vertices for the model representing the object in respect of the at least one other attribute of the vertex or vertices;
  and, when generating vertex-shaded attribute data for use in the rasterisation process of the hybrid ray tracing process, determining whether the vertex or vertices for the model representing the object in question should be processed further, using, at least in part, some or all of the vertex shaded position data in camera space generated for use in the rasterisation process in respect of the vertex or vertices by the first or second vertex shading operation as appropriate, and performing an additional vertex shading operation on a vertex or vertices that it has been determined should be processed further, wherein the additional vertex shading operation comprises performing additional vertex shading processing for at least one attribute other than position for the vertex or vertices in question to generate vertex shaded attribute data for the vertex or vertices in question in respect of the at least one other attribute of the vertex or vertices.

It is believed that such embodiments of the technology described herein are advantageous in their own right in the context of a hybrid ray tracing process, independent of whether vertex position attribute data is derived in the manner of the earlier embodiments of the technology described herein for the ray tracing and rasterisation processes.

Thus, a further embodiment of the technology described herein provides a method of operating a graphics processor comprising a programmable execution unit configured to execute programs to perform vertex shading operations on vertex attribute data to generate vertex-shaded attribute data for use in a hybrid ray tracing rendering process including both rasterisation and ray tracing processes;

the method comprising:

for a set of vertices to be processed by the graphic processor, the or each vertex having a plurality of attributes:

performing an initial vertex shading operation on one or more vertices of the set of vertices, wherein the initial vertex shading operation comprises performing, for the one or more vertices of the set, vertex shading processing for at least one attribute of the one or more vertices of the set but not for at least one other attribute of the vertex or vertices in question to generate vertex shaded attribute data for the at least one attribute of the vertex or vertices;

and, when generating vertex-shaded attribute data for use in the ray tracing process of the hybrid ray tracing process, performing an additional vertex shading operation on the vertex or vertices in question, wherein the additional vertex shading operation comprises performing additional vertex shading processing for at least one other vertex attribute of the plurality of vertex attributes belonging to the vertex or vertices in question to generate vertex shaded attribute data for the at least one other attribute of the vertex or vertices;

and, when generating vertex-shaded attribute data for use in the rasterisation process of the hybrid ray tracing process, determining whether the vertex or vertices in question should be processed further, using, at least in part, some or all of the vertex shaded attribute data for the at least one attribute generated by the initial vertex shading operation, and performing an additional vertex shading operation on a vertex or vertices that it has been determined should be processed further, wherein the additional vertex shading operation comprises performing additional vertex shading processing for at least one other vertex attribute of the vertex attributes belonging to the vertex in question, to generate vertex shaded attribute data for the at least one other attribute of the vertex or vertices.

Another embodiment of the technology described herein provides a graphics processor comprising a programmable execution unit configured to execute programs to perform vertex shading operations on vertex attribute data to generate vertex-shaded attribute data for use in a hybrid ray tracing rendering process that includes both rasterisation and ray tracing processes;

the graphics processor comprising:

a vertex fetching circuit configured to fetch vertices of a set of vertices to be processed by the graphics processor, the or each vertex having a plurality of attributes; and a vertex shading processing circuit configured to, for a fetched set of vertices to be processed by the graphics processor:

perform an initial vertex shading operation on one or more vertices of the set of vertices, wherein the initial vertex shading operation comprises performing, for the one or more vertices of the set, vertex shading processing for at least one attribute of the one or more vertices of the set but not for at least one other attribute of the vertex or vertices in question to generate vertex shaded attribute data for the at least one attribute of the vertex or vertices;

when generating vertex-shaded attribute data for use in the ray tracing process of a hybrid ray tracing process, perform an additional vertex shading operation for the one or more vertices of the set, wherein the additional vertex shading operation comprises performing additional vertex shading processing for at least other attribute of the one or more vertices of the set to generate vertex shaded attribute data for the at least one other attribute of the vertex or vertices;

and when generating vertex-shaded attribute data for use in a rasterisation process of a hybrid ray tracing process, determine whether one or more vertices of the set should be processed further, using, at least in part, some or all of the vertex shaded attribute data for the at least one attribute generated by the initial vertex shading operation, and perform an additional vertex shading operation on a vertex or vertices that it has been determined should be processed further, wherein the additional vertex shading operation comprises performing additional vertex shading processing for at least one other vertex attribute of the vertex attributes belonging to the vertex in question, to generate vertex shaded attribute data for at least one other attribute of the vertex or vertices.

The technology described herein in accordance with any one of these further embodiments may include any of the features described in relation to any other one of the other embodiments of the technology described herein described herein.

In accordance with the technology described herein in these further embodiments, the at least one attribute of the one or more vertices of the set in relation to which the initial vertex shading operation is performed is in an embodiment position. The at least one other attribute of the one or more vertices of the set are at least one attribute other than position.

The initial vertex shading operation may correspond to whichever of the first and second vertex shading operations was performed in relation to a particular vertex to provide vertex shaded position data in camera space for use in the rasterisation process where this step is performed in accordance with any of the earlier embodiments of the technology described herein.

The initial vertex shading operation provides vertex-shaded attribute data in respect of the at least one attribute e.g. position for use in both the ray tracing and rasterisation processes. The initial vertex shading operation may be implemented using one or more programs. For example, while in some embodiments a program generates such data for both the ray tracing and rasterisation processes, it is envisaged that separate programs might be used for implementing the initial vertex shading operation in respect of the ray tracing and rasterisation processes.

In these further embodiments of the technology described herein, when generating vertex-shaded attribute data for use in the rasterisation process of the hybrid ray tracing process, the vertex or vertices that it is determined should be processed further are subjected to an additional vertex shading operation that vertex shades the at least one other attribute of the vertex or vertices. Thus, the result of the determination as to whether the vertex or vertices should be processed further is used to conditionally execute the additional vertex shading operation. In an embodiment only the vertex or vertices that it is determined should be processed further are then subjected to the additional vertex shading operation (i.e. any vertex or vertices that it is determined do not need to be processed further are then not subjected to the additional vertex shading operation). In contrast, additional vertex-shaded attribute data in respect of the at least one other attribute of the vertices may be generated for use in the ray tracing process without first determining whether the vertex or vertices are to be processed further i.e. in a non-conditional manner.

The method may comprise generating an additional shading program for causing the additional vertex shading operation to be performed in respect of the at least one other attribute for use in the rasterisation process (a "rasterisation additional shading program"), and triggering performance of this additional rasterisation shading program by the programmable execution unit conditionally to generate the vertex shaded data in respect of the at least one other attribute in the manner described above.

In any of its embodiments, the method may comprise generating a rasterisation additional shading program which, when executed by the programmable execution unit, causes the performance of an additional vertex shading operation on a vertex or vertices for the model representing the object in respect of the at least one other attribute of the vertex or vertices to provide vertex shaded data for use in the rasterisation process of the hybrid ray tracing process, and providing the generated rasterisation additional shading program to the programmable execution unit for execution by the programmable execution unit;

and the programmable execution unit executing the rastersiation additional shading program in relation to the vertex or vertices for the model representing the object in question to generate vertex shaded attribute data for the at least one other attribute of the vertex or vertices in question when it has been determined that the vertex or vertices should be processed further.

The vertex shaded attribute data for the at least one other attribute of the vertex or vertices generated as a result of the additional vertex shading processing in respect of the ray tracing process may be generated at the same time as i.e. in parallel to, or subsequent to, the vertex shaded attribute data for the at least one attribute of the vertex or vertices (which is generated as a result of the initial vertex shading operation).

In some embodiments a single shader program may be configured to perform both the initial vertex shading operation and the additional vertex shading operation for the ray tracing process (whether simultaneously or subsequently). In those earlier embodiments in which first and second vertex shading operations are conditionally used to generate the position data for vertices depending upon whether there is movement of an object or change in the geometry of the model for the object to which the vertex data relates between frames, the second shading program which generates the vertex position data for the model (object) for use in the ray tracing process may also perform the additional vertex shading operation.

In some embodiments the method may comprise generating a shading program which is configured to perform both the initial vertex shading operation to generate vertex shaded attribute data for the at least one attribute of the vertex or vertices for use in the ray tracing process and to perform the additional vertex shading processing for the at least one other vertex attribute of the vertex or vertices to generate the vertex shaded attribute data for the at least one other attribute of the vertex or vertices for use in the ray tracing process. In these embodiments, operation of the shading program will generate both the initial and additional vertex shaded data for use in ray tracing. The additional vertex shaded data is generated in a non-conditional manner.

In other embodiments, separate shader programs are generated and used to perform the initial vertex shading operation and the additional vertex shading operation (whether simultaneously or subsequently). Thus, in some embodiments the additional vertex shaded data for the ray tracing process is generated using a ray tracing additional shading program. In an embodiment the operation of the additional shading program occurs (e.g. is triggered) after operation of the initial shading program. The additional shading program may be triggered in a non-conditional manner after the initial shading program has been performed.

In any of its embodiments, the method may comprise generating a ray tracing additional shading program which, when executed by the programmable execution unit, causes an additional ray tracing vertex shading operation to be performed to generate vertex shaded attribute data for a vertex or vertices of the model for the object in respect of the at least one other attribute of the vertex or vertices to provide vertex shaded data for use in the ray tracing process of the hybrid ray tracing process, and providing the generated ray tracing additional shading program to the programmable execution unit for execution by the programmable execution unit;

and the programmable execution unit executing the ray tracing additional shading program in relation to the vertex or vertices of the model for the object in question to generate vertex shaded attribute data for the vertex or vertices in respect of the at least one other attribute.

In these embodiments, the ray tracing additional shading program is separate from a program configured to perform the initial vertex shading operation for generating the vertex shaded attribute date for the at least one attribute of the vertex or vertices for use in the ray tracing process.

Where separate programs are used to generate the initial and additional vertex shaded data for use in the ray tracing process, these may operate sequentially or at the same time.

The method then may involve generating separate shading programs to provide additional vertex shading processing for at least one attribute other than position for use in generating vertex-shaded attribute data for use in the ray tracing and rasterisation processes respectively. The shading program for providing additional vertex shading processing in respect of rasterisation processes may then be triggered conditionally. In these embodiments, an initial vertex shading operation is only required to, and in an embodiment does only, generate the vertex data for the vertex or vertices in respect of the at least one attribute e.g. position (and not vertex shaded data in respect of any other attribute (e.g. non-position attribute).

Thus, in these embodiments, two separate additional shading programs are generated for generating additional vertex attribute data for use in rasterisation and ray tracing processes respectively, with the rasterisation additional shading program being executed only if it is determined that a vertex or vertices of a model for an object should be processed further. The rasterisation additional shading program is thus executed in a conditional manner. The ray tracing additional shading program may be executed in a non-conditional manner i.e. for all vertices in question. The ray tracing additional shading program may be executed without first determining whether the vertex or vertices of the model (object) should be processed further.

In any of the embodiments of the technology described herein, regardless of the way in which the ray tracing additional vertex shaded data is generated, the additional rasterisation vertex shading operation is in an embodiment performed for all the vertices (for each of the vertices) in the set of vertices being processed (e.g. of the model (object) being processed) for which it is determined that the vertex should be processed further, but if desired (and appropriate) the additional rasterisation vertex shading operation need not be performed for all (e.g. is performed for some but not all) of the vertices in question. It could also, if desired, be performed for other vertices that were not subjected to the determination of whether they should be processed further (if any), if desired.

The additional vertex shading operation performed in relation to either ray tracing or rasterisation operates to "shade" at least one other attribute of the vertices (which, in the case of rasterisation, it has been determined should be processed further.) In an embodiment, the additional vertex shading operation (whether for rasterisation or ray tracing) vertex shades all the remaining attributes of the vertices in question. The additional vertex shading operation may, for example, be performed by a vertex or geometry shader program.

The additional vertex shading operation whether for rasterisation or ray tracing in an embodiment operates to vertex shade the varyings (i.e. non-position attributes) for the vertices, such as one or more of, and in an embodiment all of: colour, texture coordinates, normals, etc. The partitioning of the vertex attributes between the initial and additional vertex shading operations can be selected as desired, e.g. based on the relative processing requirements of the attributes.

The additional vertex shading operation performed in the case of rasterisation can be triggered and performed for the vertices that are required to be processed further in any suitable and desirable manner.

The determination of whether a vertex should be processed further when generating vertex-shaded attribute data for use in the rasterisation process can be performed in any desired and suitable manner using the vertex shaded data generated in the initial vertex shading operation (which may correspond to the first or second vertex shading operation used to generate vertex position data in camera space for use in the rasterisation process as appropriate in the earlier embodiments of the technology described herein).

In an embodiment, this process determines whether the vertex could be required for generating the output of the graphics processing operation (i.e. whether the vertex could be needed to contribute to the output of the graphics processing operation).

In an embodiment, this determination comprises determining whether the vertex relates to (e.g. belongs to or is to be used for) a primitive that could be visible in the output of the graphics processing operation (and if it is determined that the vertex does not relate to (e.g. belong to or is not used for) any primitive that could be visible in the output of the graphics processing operation, then the vertex is determined as not needing to be processed further (and so, in an embodiment, is not subjected to the additional vertex shading operation).

In embodiments, the graphics processing system is a tile-based system, i.e. a deferred mode tile-based system, and the determination of whether the vertices should be processed further (and thus will be subjected to the additional vertex shading operation or not) is performed by a tiler of the graphics processing system. In an embodiment, a vertex will be deemed as needing to be processed further if it is determined to belong to a potentially visible primitive at the tiling stage, i.e. if a primitive that it belongs to (that it is to be used for) is included in a primitive list at the tiling stage.

In embodiments, the graphics processing system is a tile-based graphics processing system in which the render output of the graphics processing system is divided into a plurality of tiles for rendering purposes; and the step of determining whether the vertex or vertices in question should be processed further comprises determining whether the vertex or vertices in question belong to a primitive that is included in a primitive list for a tile of the render output being processed.

The tiler (or any other determination stage, if not the tiler) may perform any suitable test(s) in determining (from the vertex shaded position data for the vertices) which primitives are potentially visible in the render target being generated, and thus should be processed further, such as tests on the vertices (or on the primitives to which the vertices belong) based on bounding boxes, back facing determinations, or any other suitable tests that can, e.g. be performed in a tiler (at the tiling stage). For example, the tiling process will normally test whether primitives are (at least partially) within the view frustum and are therefore required for further processing. The tiler will also typically include a backward facing culling test. Thus, in embodiments the determination is made by a tiler, as the tiler already operates to perform "visibility" tests (such as view frustum and/or back facing tests and so on) on primitives for the frame to be displayed. Thus, if a primitive is included in a tile list by the tiler (the tiling process), that can be taken as an indication that (and a determination that) the primitive (and thus its vertices) should be processed further (and vice-versa).

In an embodiment, the determination comprises at least one of, and in an embodiment both of: determining whether the vertex belongs to a primitive that lies at least partially within the view frustum for the output being generated by the rasterisation process; and whether the vertex belongs to a forward facing primitive. Then, if the vertex is determined to belong to a forward facing primitive that lies at least partially within the view frustum, it is determined as needing to be processed further (and subjected to the additional vertex shading operation), but any vertex that solely belongs to primitives that lie entirely outside the view frustum or that are backward facing, is determined as not needing to be processed further (and so, in an embodiment, is not subjected to the additional vertex shading operation (and is not processed further)).

Thus, in embodiments of the technology described herein, the tiler operates in the normal manner to generate one or more data structures for use in rasterisation (e.g. to receive primitive vertex index lists comprising the vertex indices making up a draw call, and to perform the necessary visibility tests for arranging (potentially) visible primitives into tile lists), but instead of generating a full set of vertex shaded attributes before the tiling operation, only the vertex shaded position data is generated before the tiling operation. (It will be appreciated that the vertex shaded position data is the only vertex shaded attribute required for correct operation of the tiler.)

Correspondingly, in embodiments of the technology described herein, the initial vertex shading operation for the purposes of rasterisation is performed at a stage of the graphics processing system which is before tiling, and the additional vertex shading operation for rasterisation is performed after tiling (but before rasterising, for example) and is only performed for the vertices that have been determined, at the tiling stage, as potentially being required for generating the graphics processing output, in an embodiment based on the vertex shaded data generated by the initial vertex shading operation.

The additional vertex shading operation for ray tracing may also be performed after tiling for the purposes of ray tracing where such a function is performed. As discussed in more detail below, in embodiments of the technology described herein, the the tiler may be configured to provide "tiling" functionality for the purposes of both ray tracing and rasterisation. Such operations are in an embodiment performed sequentially, although it is envisaged that they may alternatively be performed in parallel. However, in other embodiments, tiling is not necessarily performed for the purposes of ray tracing, and the necessary data structures may be generated by other means e.g. a dedicated ray tracing data structure generator.

Once the rasterisation additional vertex shading operation has been performed for the vertices that it has been determined should be processed further, then the complete vertex shaded attribute data for the vertices for both the rasterisation and ray tracing processes (i.e. the vertex shader data from the initial and any additional vertex shading operations), together with any data structures generated for the purposes of ray tracing or rasterisation, e.g., primitive lists for tiles or acceleration data structures generated e.g. by a tiler, can be passed to (and used by) the remaining stages implemented by the graphics processor to generate the desired graphics processing output (render target) using a hybrid ray tracing process. The method involves performing both ray tracing and rasterisation processes. These processes can be performed in any desired and suitable manner, e.g. depending upon the nature of the graphics processing system in question. The final output of the graphics processing operation can then, e.g., be written, e.g. to a frame buffer, in main memory, from where it can then, e.g., be provided to a display for display, or otherwise processed.

The process may then be repeated for the next render output (e.g. the next frame to be displayed, and so on). (The technology described herein is in an embodiment implemented for a sequence of frames to be displayed, and in an embodiment for each frame in a sequence of frames to be displayed, for example.)

In accordance with any of the embodiments of the technology described herein, the graphics processing system may be an Immediate Mode (IM) graphics processing system. However, in other embodiments, the graphics processing system is a tile-based system i.e. a deferred mode tile-based system.

In accordance with the technology described herein in any of its embodiments in which the graphics processing system is a tile based graphics processing system in which the render output of the graphics processor is divided into a plurality of tiles for rendering purposes, the method may then comprise operating the tiler to arrange primitives to be processed by the graphics processor in primitive lists for respective tiles that the render target output of the graphics processor has been divided into for rendering purposes, and outputting the primitive lists for use in the rasterisation process of the hybrid rendering process. The tiler will assign a given primitive to a particular list based on the location of the primitive.

When performing ray tracing, one or more data structures may need to be generated. For example, a data structure indicative of the geometry of objects in a scene may be used to facilitate determining ray intersection data. Such a data structure may often be referred to as an "acceleration data structure". A data structure for the purposes of ray tracing may be generated using a dedicated data structure generator. However, the Applicant has recognised that the operation of the tiler to produce primitive lists for tiles when performing rasterisation uses processing that is similar e.g. in terms of inputs, operations and outputs required, to the logic and processing that is required to generate such data structures for use in ray tracing.

Thus, in embodiments in which the graphics processing system comprises a tiler, the tiler is additionally configured to generate a data structure for use in the ray tracing process, and the method further comprises operating the tiler to generate one or more such data structures.

It is believed that such embodiments are advantageous in their own right. Thus, a further embodiment of the technology described herein provides a tile-based graphics processor, the graphics processor comprising:

a tiler that is configured to arrange primitives to be processed by the graphics processor in primitive lists for respective tiles that the render output of the graphics processor has been divided into for rendering purposes, and to output the primitive lists for use in a rasterisation process;

wherein the tiler is additionally configured to generate one or more data structures for use in a ray tracing process, and to output the one or more data structures for use in a ray tracing process.

Yet another embodiment of the technology described herein provides a method of operating a tile-based graphics processor that includes a tiler configured to arrange primitives to be processed by the graphics processor in primitive lists for respective tiles that the render output of the graphics processor has been divided into for rendering purposes, and to output the primitive lists for use in a rasterisation process;

the method comprising causing the tiler to:

arrange primitives to be processed by the graphics processor in primitive lists for respective tiles that the render output of the graphics processor has been divided into for rendering purposes, and to output the primitive lists;

and generate one or more data structures for use in a ray tracing process, and to output the one or more data structures.

The technology described herein in accordance with any one of these further embodiments may include any of the features described in relation to any other one of the other embodiments of the technology described herein described herein.

It will be appreciated that the rasterisation and ray tracing processes referred to in these further embodiments of the technology described herein may form part of separate rendering processes. Thus, the ray tracing process may be a full ray tracing process. However, in other embodiments the rasterisation and ray tracing processes may form part of a hybrid rendering process. Thus, the ray tracing process may then include only some of the steps of a full ray tracing process.

References to "the" data structure for use in the ray tracing process herein may apply to any one or ones of the one or more data structures generated by the tiler for use in a ray tracing process.

The data structure for ray tracing (which may be referred to herein as a "ray tracing data structure") may be any suitable structure which may be used in a ray tracing process. In some embodiments the data structure is a tree structure. For example, the data structure may be a bounding volume hierarchy (BVH) tree. However, other e.g. simpler data structures may be envisaged. The nature of the data structure required for a ray tracing process may be set by a driver of the graphics processor.

The data structure for ray tracing is in an embodiment indicative of geometry (models/objects) in a (the) frame to be rendered, and in an embodiment indicative of the distribution of geometry (models/objects) in the frame to be rendered. Such a data structure may be used to facilitate the determination of ray intersection data in a ray tracing process.

It has been recognised that only minimal modification may be required to enable a tiler able to provide data structures e.g. tile lists for use in a rasterisation process, to also provide data structures for use in ray tracing.

The tiler may be configured to assemble primitives (i.e. in camera space) for use in generating primitive lists for tiles for use in a rasterisation based process. The primitives may be referred to as perspective transformed primitives. The step of assembling the primitives may be performed using data indicative of a list of primitives to be processed (e.g. for a draw call) and vertex-shaded position data (i.e. in camera space) generated for vertices. The data indicative of the list of primitives to be processed may be primitive index data.

In accordance with the earlier embodiments of the technology described herein, the vertex-shaded position data for use in assembling the primitives (for use in generating the primitive lists) may be the vertex-shaded position data in camera space generated for use in the rasterisation process of the hybrid rendering process by either the first or the second vertex shading operation. In these embodiments, the tiling process for the purposes of rasterisation may be performed in respect of vertices of objects regardless of whether or not they move, or the geometry thereof changes, between frames i.e. using vertex-shaded position data generated by both the first and the second vertex shading operations.

In an embodiment the tiler is additionally configured to assemble primitives (i.e. in world space) for use in generating the one or more data structure for use in the ray tracing process. These primitives are three-dimensional primitives. The step of assembling the primitives may be performed using data indicative of a list of primitives to be processed (e.g. for a draw call) and vertex-shaded position data (i.e. in world space) generated for vertices. The data indicative of the list of primitives to be processed may be primitive index data.

Thus, in accordance with these further embodiments of the technology described herein, the tiler may comprise a primitive assembly circuit configured to assemble primitives (i.e. in camera space) for use in generating primitive lists for tiles for use in the rasterisation process using vertex-shaded position data (i.e. in camera space) and primitive index data, and to assemble primitives (i.e. in world space) for use in generating the one or more data structures for use in the ray tracing process using vertex-shaded position data (i.e. in world space) and primitive index data.

The tiler may comprise a primitive arranger configured to assign (assembled) primitives (i.e. in camera space) to render output regions (areas) for generating primitive lists for tiles for use in the rasterisation process. The step of assigning the assembled primitives to render output regions (areas) may involve using vertex position data (i.e. in camera space) for the assembled primitives and data indicative of the position of the boundaries of the regions (i.e. in camera space) that the render output of the graphics processor has been divided into for primitive listing purposes. This may comprise performing binning of the assembled primitives e.g. using a binning circuit. Thus, the primitive arranger may comprise such a binning circuit.

In an embodiment the primitive arranger of the tiler is additionally configured to assign the (assembled) primitives (i.e. in world space) to respective ones of a plurality of (three-dimensional) bounding volumes (i.e. in the world space) in order to generate a data structure for use in ray tracing. The data structure may be in the form of a tree structure e.g. a BVH tree. The bounding volumes may be axis aligned (cuboid) volumes. The step of assigning the primitives to bounding volumes may comprise using vertex position data (i.e. in world space) for the (assembled) primitives and data indicative of the boundaries of the (three-dimensional) bounding volumes. This may comprise performing binning of the assembled primitives e.g. using a binning circuit. Thus, the primitive arranger may comprise such a circuit.

In embodiments the primitive arranger comprises a binning circuit configured to assign (assembled) primitives (i.e. in camera space) to the regions that the render output of the graphics processor has been divided into for tiling purposes, and which binning circuit is additionally operable to assign (assembled) primitives (i.e. in world space) to bounding volumes in order to generate a data structure for use in ray tracing.

In embodiments, the (assembled) primitives (i.e. in camera space) that are assigned to primitive lists are a subset of the (assembled) primitives (in camera space) obtained by the tiler using the vertex-shaded position data and the primitive index data. In embodiments, only those primitives which are determined to be potentially visible in the output being generated are processed further by the tiler for the purposes of rasterisation, and any primitives which are not determined to be potentially visible are culled. Thus only those primitives which are determined to be potentially visible are assigned to primitive lists.

The tiler may comprise a visibility checking circuit for determining whether a (assembled) primitive (i.e. in camera space) is potentially visible in the output being generated when generating primitive lists. Any suitable test(s) may be performed by the visibility checking circuit to identify those primitives which are potentially visible (or conversely identify those primitives which are not potentially visible). The visibility checking circuit may, for example, determine whether a primitive lies at least partially within a view frustrum for the output being generated. The visibility checking circuit may alternatively or additionally perform a backward facing culling test to identify any backward facing primitives and remove them from further processing.

The visibility checking circuit may comprise a bounding box generator circuit. The bounding box generator circuit may be configured to generate, for each primitive, a bounding box covering the primitive. The visibility test(s) performed by the visibility checking circuit may then be performed in relation to the bounding box (e.g. by performing backface culling, frustrum and viewport culling, scissoring, and/or sample aware tiling tests on the bounding boxes).

The Applicant has appreciated that such visibility checking is not required for primitives defined in world space, as such primitives can all be assumed to be visible in the world space. Thus, in an embodiment, the visibility checking circuit is disabled (a visibility check is omitted (not performed)) when the tiler is being used to generate the one or more data structures for use in a ray tracing process.

In summary, the tiler may include some or all of the following functionality as part of the process of generating primitive lists for tiles for use in the rasterisation process:

a vertex fetcher for fetching vertex-shaded position data generated for vertices to be processed in camera space;
a primitive index fetcher for fetching primitive index data indicative of a list of primitives to be processed;
a primitive assembly circuit for assembling primitives in camera space (3D perspective transformed primitives) for further processing using the vertex-shaded position data and the primitive index data;
a visibility checking circuit for determining which primitives in camera space are potentially visible in the render target being generated and which should be processed further;
a primitive arranger for arranging the primitives in camera space identified for further processing into respective primitive lists for tiles in the render target;
a tile list buffer for storing data indicative of the primitive list for the tiles;
and a list outputting circuit for outputting data indicative of the primitive lists. The list outputting circuit may be operable to compress the data indicative of the primitive lists. Some or all of the following functionality may be required as part of the process of generating a data structure for use in the ray tracing process:
a vertex fetcher for fetching vertex-shaded position data generated for vertices to be processed in world space;
a primitive index fetcher for fetching primitive index data indicative of a list of primitives to be processed;
a primitive assembly circuit for assembling primitives in world space for further processing using the vertex-shaded position data and the primitive index data;
a primitive arranger for arranging the primitives into respective ones of a plurality of bounding volumes (in world space) for generating the ray tracing data structure;
a ray tracing data structure buffer for storing data indicative of a generated data structure;
and a ray tracing data structure outputting circuit for outputting data indicative of a generated ray tracing data structure. The outputting circuit may be operable to compress the data indicative of the ray tracing data structure.

The main modifications to enable a tiler configured to provide primitive lists for render output regions for use in rasterisation to also provide a data structure for use in ray tracing would be one or more of, and in an embodiment all of:
that the vertex fetcher is additionally able to fetch vertex shaded position data generated for vertices to be processed in world space;
that the primitive assembly circuit is able to additionally operate on primitives defined in world space as well as camera space;
that the visibility checking circuit may be disabled when generating data structures for ray tracing;
that the primitive arranger is additionally configured to assign primitives to bounding volumes in world space e.g. including a binning circuit configured to operate in relation to primitives in both camera space and world space;
that the tile list buffer is able to additionally store the generated data structures for use in ray tracing;
and that the list outputting circuit is additionally configured to output generated data structures for ray tracing.

In these further embodiments of the technology described herein the tiler is configured to perform the function of generating primitive lists for use in a rasterisation process, and to generate one or more data structures for use in a ray tracing process. The tiler may be configured to perform these functions one after the other (in any order), or simultaneously i.e. in parallel. In such embodiments, the tiler would receive, as inputs, vertex-shaded position data in both world and camera space, for use in generating ray tracing data structures and primitive lists for tiles respectively.

In embodiments the tiler is configured to generate the one or more data structure for use in ray tracing and the primitive lists for tiles for use in rasterisation one after the other. This may help to reduce the local memory required to store the resulting ray tracing data structure(s) and primitive lists for tiles. The local buffering available to support these operations in the tiler may be limited. If the primitive lists and ray tracing data structures are generated simultaneously, this may require a larger buffer in order to maintain throughput at a desired level. Thus, these embodiments may enable the necessary data structures for use in the ray tracing and rasterisation processes of a hybrid ray tracing process to be generated more efficiently, helping to optimise the ray tracing process.

In embodiments the tiler is configured to generate the one or more ray tracing data structure and the primitive lists sequentially (in any order). In an embodiment the tiler is configured to generate the one or more data structures for ray tracing before the primitive lists for rasterisation. In these embodiments, the tiler may be used to provide primitive lists and one or more data structures for use in the rasterisation and ray tracing processes of a hybrid ray tracing process respectively.

In accordance with the technology described herein in any of its embodiments, the rasterisation process of the hybrid ray tracing process may be used to generate an intermediate structure for use in the ray tracing. The method may extend to the step of performing a rasterisation process to generate an intermediate data structure e.g. in respect of the frame being processed, and generating output data for data elements of the new frame using a ray tracing process that uses the intermediate data structure. The intermediate data structure may be obtained by performing a rasterisation pass for some or all of the new frame.

As used herein, a "hybrid ray tracing rendering process" refers to a rendering technique in which both ray tracing and rasterisation processes are performed. Thus, in a hybrid ray tracing process, only some of the steps of a full ray tracing process are performed, with a rasterisation process or processes being used to implement the other steps of the full ray tracing process. In embodiments the hybrid ray tracing process may comprise determining the first intersection of each one of a plurality of rays (primary rays), each ray extending from a viewpoint through a data element considered in an image plane, with an object in the scene using a rasterisation process. The hybrid ray tracing process may further comprise casting one or more further (secondary) rays from the determined respective first intersection points of primary rays with objects in the scene using a ray tracing process. The process may then comprise analysing the intersections of the secondary rays with objects in the scene, and additionally using the intersection data for the secondary rays in determining the output data for data elements.

(A "full" ray tracing process may involve casting a ray of light from a viewpoint, (which may be referred to as a "camera"), through each data element e.g. pixel considered in an image plane. The process determines, for each ray, a closest object in a scene that the ray intersects. The point of intersection may be referred to as a "first intersection point" of the ray. Thus, a full ray tracing process may involve determining the intersection of rays passing through respective data elements of the frame with objects in a scene and then determining output data for the data elements using the intersection data. Each ray considered that is cast from the viewpoint through a data element in this manner may be referred to as a "primary ray". The process may involve casting further (secondary) rays from the respective first intersection points of primary rays with objects in the scene, analysing the intersections of the secondary rays with objects in the scene, and additionally using the intersection data for the secondary rays in determining the output data for data elements.)

The technology described herein can be implemented in any suitable system, such as a suitably configured microprocessor based system. In an embodiment, the technology described herein is implemented in a computer and/or micro-processor based system.

The technology described herein is applicable to any form or configuration of graphics processor, such as graphics processors having a "pipelined" arrangement (in which case the graphics processor executes a rendering pipeline).

As will be appreciated by those skilled in the art, the graphics processor of the technology described herein may be part of an overall graphics processing system that includes, e.g., a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and, in an embodiment does, also execute a driver for the graphics processor and a compiler or compilers for compiling programs to be executed by the programmable execution unit of the graphics processor.

The graphics processor may also comprise, and/or be in communication with, one or more memories and/or memory devices that store the data described herein, and/or the output data generated by the graphics processor, and/or store software (e.g. (shader) program) for performing the processes described herein. The graphics processor may also be in communication with a host microprocessor, and/or with a display for displaying images based on the data generated by the graphics processor.

As well as any programmable processing (shader) stages, such as a vertex shader, and/or a tiler as applicable, the graphics processor and pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processor may output. Thus, it may be used when generating frames for display, render-to-texture outputs, etc. The output data values from the graphics processor is, in an embodiment, exported to external, e.g. main, memory, for storage and use.

The technology described herein is applicable to any suitable form or configuration of graphics processor. It is particularly applicable to tile-based graphics processors and graphics processing systems. Thus in an embodiment, the graphics processing system and graphics processor are a tile-based system and pipeline, respectively.

In an embodiment of the technology described herein, the various functions of the technology described herein are carried out on a single graphics processing platform that generates and outputs the rendered item data that is, e.g., written to the frame buffer for the display device.

The various functions of the technology described herein can be carried out in any desired and suitable manner. For example, unless otherwise indicated, the functions of the technology described herein can be implemented in hardware or software, as desired. Thus, for example, unless otherwise indicated, the various functional elements, stages, and "means" of the technology described herein may comprise a suitable processor or processors, controller or controllers, functional units, circuitry, circuits, processing logic, microprocessor arrangements, etc., that are configured to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, unless otherwise indicated, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may be provided as a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the components of the graphics processing system can otherwise include any one or more or all of the usual functional units, etc., that such components include.

It will also be appreciated by those skilled in the art that all of the described embodiments of the technology described herein can, and, in an embodiment, do, include, as appropriate, any one or more or all of the features described herein.

The methods in accordance with the technology described herein may be implemented at least partially using software e.g. computer programs. It will thus be seen that the technology described herein may provide computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc. The technology described herein also extends to a computer software carrier comprising such software which when used to operate a display controller, or microprocessor system comprising a data processor causes in conjunction with said data processor said controller or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus, in a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CDROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrinkwrapped software, preloaded with a computer system, for example, on a system ROM or fixed disk, or distributed from a server or electronic bulletin board over a network, for example, the Internet or World Wide Web.

Figure 2:
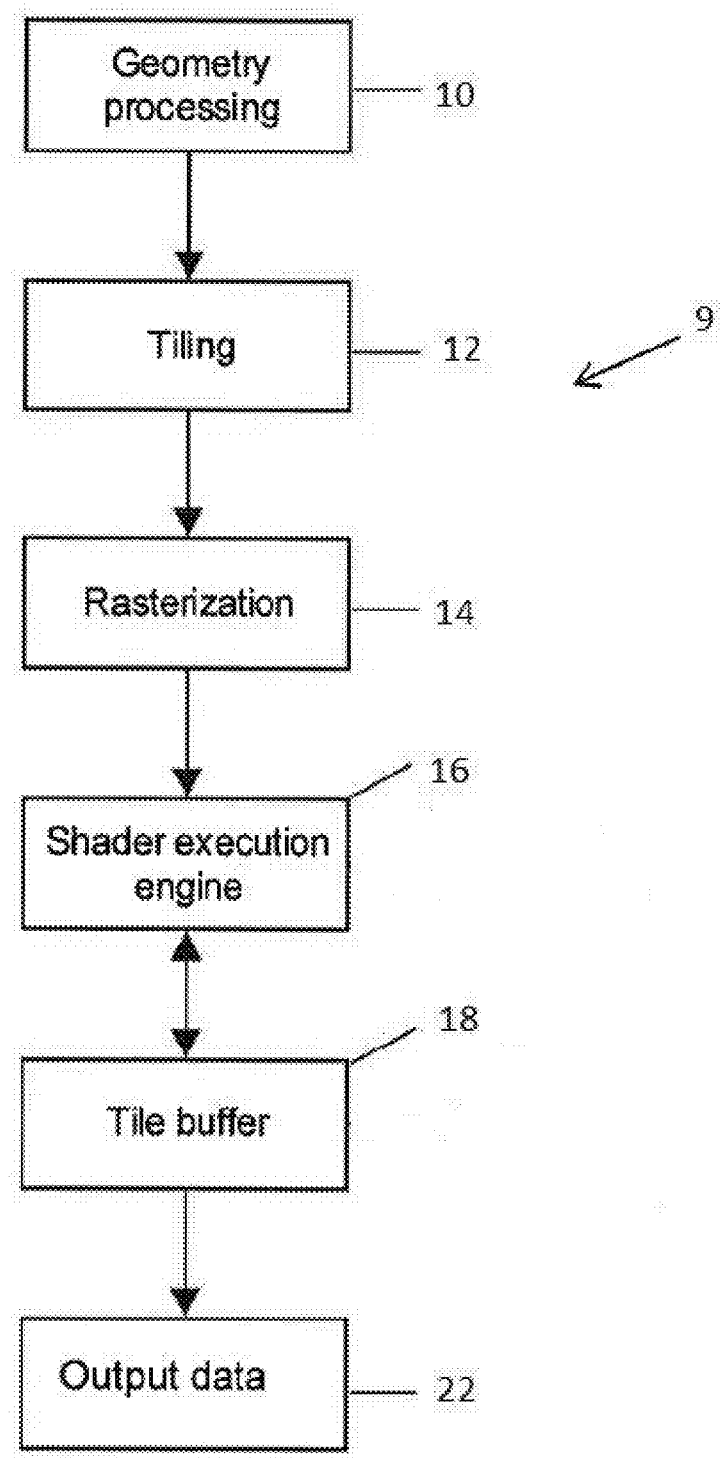
FIG. 2 shows schematically an arrangement of a graphics processor that can be controlled in accordance with the technology described herein.

FIG. 2 shows an exemplary graphics pipeline 9 which may be executed by a graphics processor (GPU) 2 of a graphics processing system 8, e.g. as shown in FIG. 1. The graphics processing pipeline 9 shown in FIG. 2 is a tile-based graphics processing pipeline, and will thus produce tiles of a render output data array, such as an output frame to be generated.

As shown in FIG. 2, the graphics processing pipeline 9 includes a geometry/vertex processing stage 10, a tiling stage 12, a rasterisation stage (a rasteriser) 14, a renderer in the form of a shader execution engine 16 that performs fragment shading operations, and a tile buffer 18. The pipeline 9 produces an output render data array 22. The output render data array 22 may typically be output render data (an image) for a frame intended for display on a display device, such as a screen or printer, but may also, for example, comprise intermediate render data intended for use in later rendering passes (also known as a "render to texture" output), etc.

When a computer graphics image is to be displayed, it is usually first defined as a series of primitives (polygons), which primitives are then divided (rasterised) into graphics fragments for graphics rendering i.e. shading in turn. During a normal graphics rendering operation, the renderer will modify the (e.g.) colour (red, green and blue, RGB) and transparency (alpha, a) data associated with each fragment so that the fragments can be displayed as required. Once the fragments have fully traversed the renderer, then their associated data values are stored in memory, ready for output, e.g. for display.

FIG. 2 shows the main elements and pipeline stages. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may, unless otherwise indicated, be implemented as desired and will accordingly comprise, e.g., appropriate circuitry, circuits and/or processing logic, etc., for performing the necessary operation and functions.

As shown in FIG. 2, the graphics pipeline 9 includes a geometry processing stage 10 which defines the graphics primitives (polygons). This geometry processing will include, inter alia, vertex shading of vertices to be processed when generating a render output. The tiling stage 12 performs the process of "tiling" to allocate the defined primitives to primitive lists for respective render output regions (areas) which are then used to identify the primitives that should be rendered for each tile that is to be rendered to generate the output data (which in this embodiment is a frame to be rendered for display). For example, the tiling stage may be implemented using a primitive list building unit which takes as its input transformed and processed vertex (geometry) data from the geometry processing stage 10 e.g. from a programmable vertex shader (i.e. the positions of the primitives in the frame), builds primitive lists using that data, and stores those lists as the primitive lists in a memory.

The rasterisation stage 14 takes as its input a primitive and its vertices, rasterises the primitive to fragments, and provides those fragments to the shader execution engine 16. The shader execution engine 16 is a programmable execution unit that performs fragment shading by executing fragment shading software routines (programs) for fragments received from the rasteriser 14.

Each graphics "fragment" that is shaded may correspond to a single pixel (picture element) in the final display (since as the pixels are the singularities in the final display, there may be a one-to-one mapping between the "fragments" the graphics processor operates on (renders) and the pixels of the display). However, it can be the case that there is not a one-to-one correspondence between a fragment and a display pixel, for example where particular forms of post-processing, such as down-scaling, are carried out on the rendered image prior to displaying the final image.

Each fragment will be processed by means of one or more execution threads which will execute the instructions of the shader program in question for the fragment in question. Typically, there will be multiple execution threads each executing at the same time (in parallel).

In addition to rasterisation, another rendering process that may be performed e.g. by a graphics processor is so-called "ray tracing". Ray tracing is a rendering process which involves tracing the paths of rays of light from a viewpoint (sometimes referred to as a "camera") back through pixels in an image plane into a scene, and simulating the effect of the interaction between the rays and objects in the scene. The output data value e.g. colour of a pixel in the image is determined based on the object(s) in the scene intersected by the ray passing through the pixel, and the properties of the surfaces of those objects. The ray tracing calculation is complex, and involves determining, for each pixel, a set of objects within the scene which a ray passing through the pixel intersects.

Ray tracing is considered to provide better i.e. more realistic images than rasterisation rendering techniques, particularly in terms of the ability to capture reflection, refraction and lighting effects. However, ray tracing is significantly more processing intensive than rasterisation.

Figure 3:
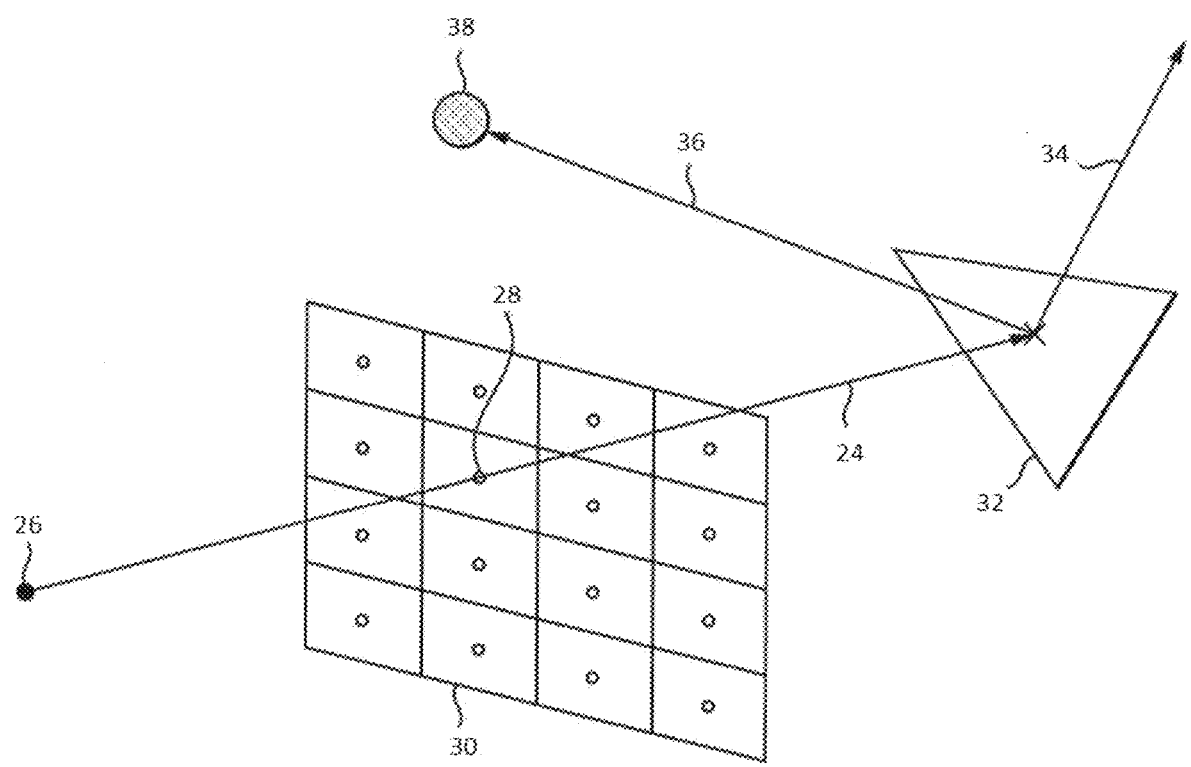
FIG. 3 is a schematic diagram illustrating a ray tracing process.

FIG. 3 illustrates an exemplary ray tracing process. This Figure is illustrative of a full ray tracing process. A ray 24 (the "primary ray") is cast backward from a viewpoint 26 (e.g. camera position) through a pixel 28 in an image plane 30. The point X at which the ray first intersects an object 32 e.g. primitive in a scene is identified i.e. the first intersection point. This first intersection will be with the object in the scene closest to the pixel. In an embodiment, a secondary ray in the form of shadow ray 36 may be cast from the first intersection point X to a light source 38. The casting of secondary rays may be used where it is desired to add shadows and reflections into the image. A secondary ray may be cast in the direction of each light source, (and, depending upon whether or not the light source is a point source, more than one secondary ray may be cast back to a point on the light source. It will be appreciated that, in this example, only a single bounce of the ray 24 is considered, before tracing the reflected ray back to the light source. However, a higher number of bounces may be considered if desired, although this will increase the complexity of the ray tracing processing. With each interaction of a ray with an object, some of the light will be absorbed, and so reflection off larger numbers of surfaces of objects will have a limited effect on the final output value obtained for a pixel. A limited number of bounces of a ray may therefore be considered without significant impact on the resulting quality of output data obtained.

Depending upon the material of the surface of the object 32, another secondary ray in the form of reflected ray 34 may be traced from the intersection point X through the object 32. If the object is, at least to some degree, transparent, then a refracted secondary ray may be considered. The output data for the pixel 28 i.e. a colour value (e.g. RGB value) thereof, may be determined taking into account the interactions of the primary, and any secondary ray(s) cast, with objects in the scene. The same process is conducted in respect of each pixel to be considered in the image plane 30.

In general, where secondary rays are considered, if the surface of an object intersected by the primary ray is a specular surface i.e. is a smooth surface which can be assumed to act like a mirror, a single reflected secondary ray may be cast in the direction of reflection by the surface. For a glossy i.e. irregular surface, which results in diffuse reflection, multiple secondary reflected rays may be cast, e.g. according to a distribution function defined by the properties of the reflective material of the surface. This may, for example, result in rays being cast in random directions for a truly glossy surface, or, for a more specular surface, in directions around the direction in which the single reflected ray would be reflected if the surface were truly specular i.e. mirror-like.

To simplify the calculation, a single secondary ray may be selected for use in determining output data based on the distribution function, even where the material of the surface of the object is not truly specular. Various techniques may then be used to compensate for any loss of quality. For example, multiple primary rays may be cast in respect of a given pixel, with only one of a plurality of secondary rays arising at a first intersection point of the primary ray being considered in respect of each primary ray. A final output value for the pixel may then be determined based on the output data determined in respect of each primary ray cast through the pixel, i.e. based on the interaction of the primary ray, and its associated secondary ray, with objects in the scene.

A flow chart illustrating the steps of the ray tracing process will now be described by reference to FIG. 4.

When performing ray tracing, for each primary ray i.e. each ray passing from the viewpoint through a respective pixel in the image plane, the first intersection of the ray with an object in the scene must be determined. To facilitate ray tracing, various intermediate data structures may be generated. For example, an intermediate data structure indicative of the geometry (e.g. objects) in the scene may generated. Such an intermediate data structure may be referred to as an "acceleration data structure". The use of an acceleration data structure may facilitate determining the first intersection data for the primary rays associated with pixels in the image plane, avoiding the need to test every object in the scene for intersection with the primary ray. The acceleration data structure may enable a subset of the objects to be identified which a primary ray is most likely to intersect. A further intermediate data structure may be generated comprising data to facilitate traversal of the acceleration data structure.

The acceleration data structure may take on various forms, for example a Bounding Volume Hierarchy (BVH). A BVH is a tree structure in which the complete scene is enclosed in an axis-aligned bounding volume (AABV) e.g. a cube, and recursively subdivided into successive pairs of two sub-AABVs according to various subdivision schemes (e.g. same number of primitives per child, based on traversal cost, etc.). The BVH type acceleration data structure will have a number of leaves, each of which is associated with only a small number of objects of the scene. A primary ray may be tested against the hierarchy of AABVs in the BVH until a leaf node is found. It is then only necessary to test the objects associated with the particular leaf node for intersection with the primary ray.

Figure 4:
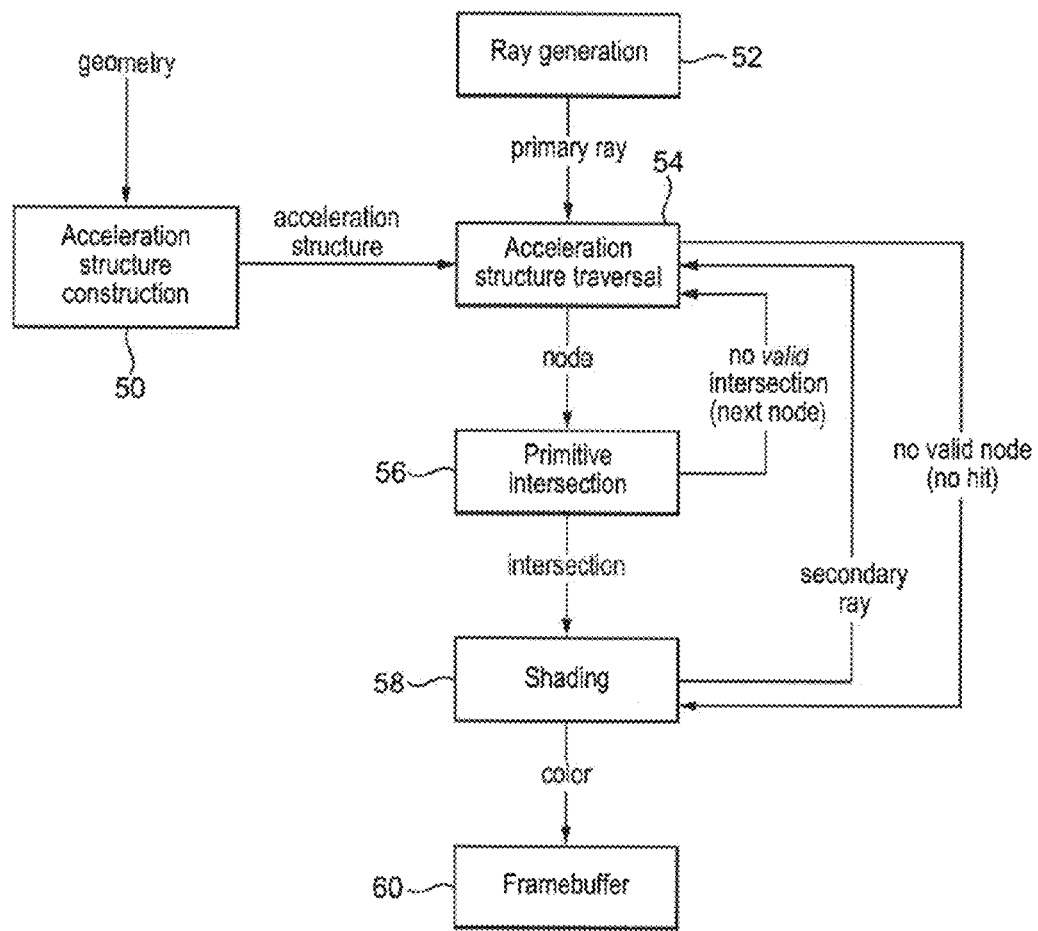
FIG. 4 is a flow chart illustrating one embodiment of a full ray tracing process.

Referring to FIG. 4, in step 50, the geometry of the scene is first analysed and used to obtain an acceleration data structure (step 50), for example in the form of a BVH tree structure, as exemplified above. A primary ray is generated, passing from a camera through a particular pixel in an image plane (step 52). The primary ray traverses the acceleration data structure (step 54), and a leaf node which contains objects which the ray potentially intersects with can be identified. It is then determined whether the ray intersects any of the objects e.g. primitives in this leaf node (step 56). If no (valid) object can be identified which the ray intersects in the node, the method returns to step 54, and the ray continues to traverse the acceleration data structure and the next leaf node which may contain an object with which the ray intersects is identified, and a test for intersection performed according to step 56. It will be appreciated that a further intermediate data structure may be generated comprising data relating to the traversal of the acceleration data structure. For example, this may enable the acceleration data structure to be traversed starting at a lower level in the tree, rather than at the root, in the example where the acceleration data structure is a BVH.

Once an object is identified which the ray intersects, the process proceeds to step 58, and the pixel is shaded, taking into account the properties of the surface of the object at the intersection point. In an embodiment, depending upon the complexity of the ray tracing process, one or more secondary rays may be generated emanating from the intersection point, as illustrated in FIG. 4 (e.g. shadow ray, refraction ray etc.). Steps 54, 56 and 58 are then performed in relation to the or each secondary ray.

A shaded colour for the pixel is then determined based on the shading of the pixel determined in step 58 in respect of the primary ray, and any secondary rays considered. The shaded colour for the pixel is then stored in the frame buffer (step 60).

If no (valid) node can be identified in step 54 which may include an object intersected by a given ray (whether primary or secondary), the process moves to step 58, and shading is performed.

This process is performed for each pixel in the image plane e.g. frame.

In embodiments using an acceleration data structure, a further intermediate data structure may be generated to facilitate traversal of the acceleration data structure.

In an alternative embodiment, a ray tracing process may be used, in which only some of the steps of the full ray tracing process described in relation to FIGS. 3 and 4 are performed. Such a ray tracing process may be referred to as a "hybrid ray tracing process". In one exemplary hybrid process, an intermediate rasterisation data structure is generated indicative of the first intersection point (i.e. the intersection with the closest object in the scene) of each primary ray passing from a viewpoint through a pixel in the image plane.

Figure 5:
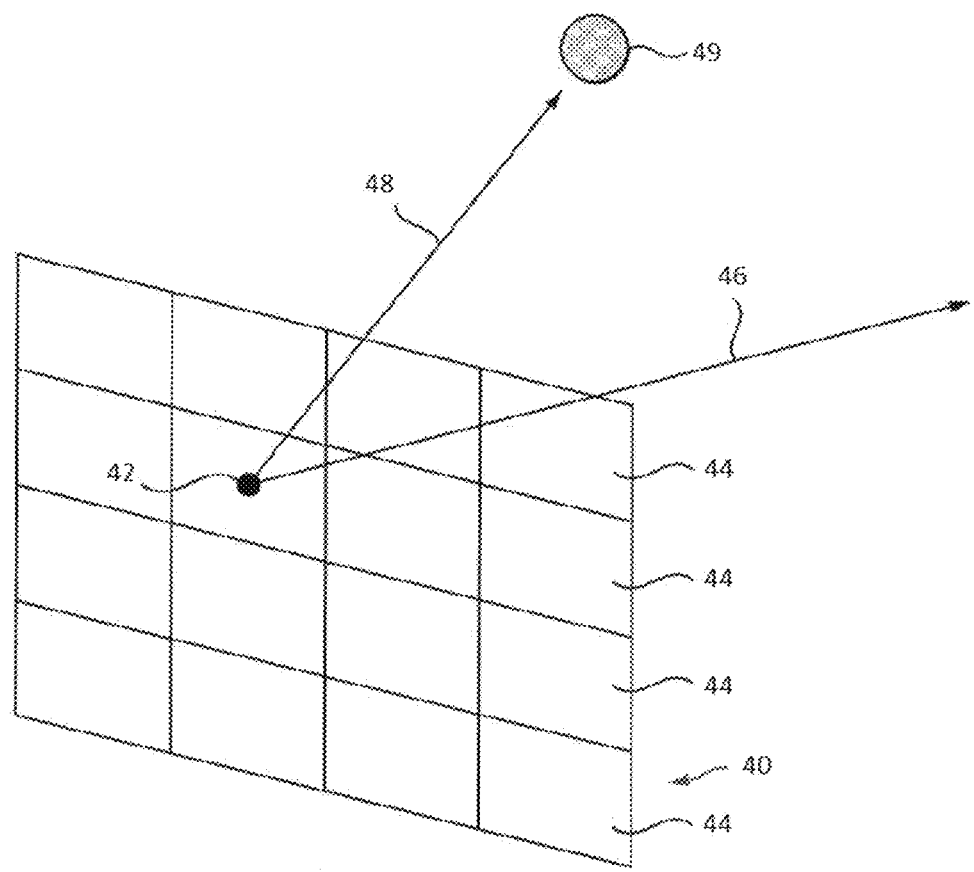
FIG. 5 is a schematic diagram illustrating a hybrid ray tracing process.

As shown in FIG. 5, the first intersection point 42 for each pixel 44 in the image plane may be stored in an intermediate data structure known as a "G-buffer" 40. Thus, the process of generating a primary ray for each pixel, and identifying the first intersection point of the primary ray with an object in the scene, is replaced with an initial rasterisation process to generate the "G-buffer". The G-buffer includes information indicative of the depth, colour, normal and surface properties for each first (closest) intersection point in the image plane i.e. frame. Secondary rays e.g. shadow ray 48 to light source 49 and refraction ray 46 may then be cast starting from the first intersection point 42, and the shading of the pixels determined based on the properties of the object first intersected, and the interactions of the secondary rays with objects in the scene.

Referring to the flowchart of FIG. 4, in such a hybrid process, steps 54 and 56 of the full ray tracing process may be omitted, as there is no need to cast primary rays, and determine their first intersection with objects in the scene. The first intersection point data for each pixel is instead obtained from the G-buffer. The process may then proceed to the shading stage 58 based on the first intersection point for each pixel obtained from the G-buffer. However, where secondary rays are considered emanating from the first intersection point, these will need to be cast in the manner described by reference to FIG. 4. Thus, steps 54, 56 and 58 will be performed in the same manner as previously described in relation to the full ray tracing process for the secondary rays. The colour determined for a pixel will be written to the frame buffer in the same manner as step 60 of FIG. 4, based on the shading colour determined for the pixel based on the first intersection point (as obtained from the G-buffer), and, where applicable, the intersections of any secondary ray with objects in the scene, determined using ray tracing.

The present embodiments are concerned with certain techniques which may improve the efficiency with which hybrid ray tracing may be performed.

When performing hybrid ray tracing, it will be seen that both rasterisation and ray tracing processes are performed. Both these techniques require initial data structures upon which to operate. A scene to be rendered may include a number of objects. These objects are represented by models defined for the frame to be rendered. The models are defined in a three-dimensional model space. Each model may represent one or more objects in the scene. It is envisaged that a model might model an entire scene, such that there would only be one model for a frame. However, more usually, a model for a frame represents an object in the scene. There may be multiple instances of a given object (and thus model) in the scene. For example, a model may model a tree in the scene. There may be a number of such trees present in the scene.

Figure 6:
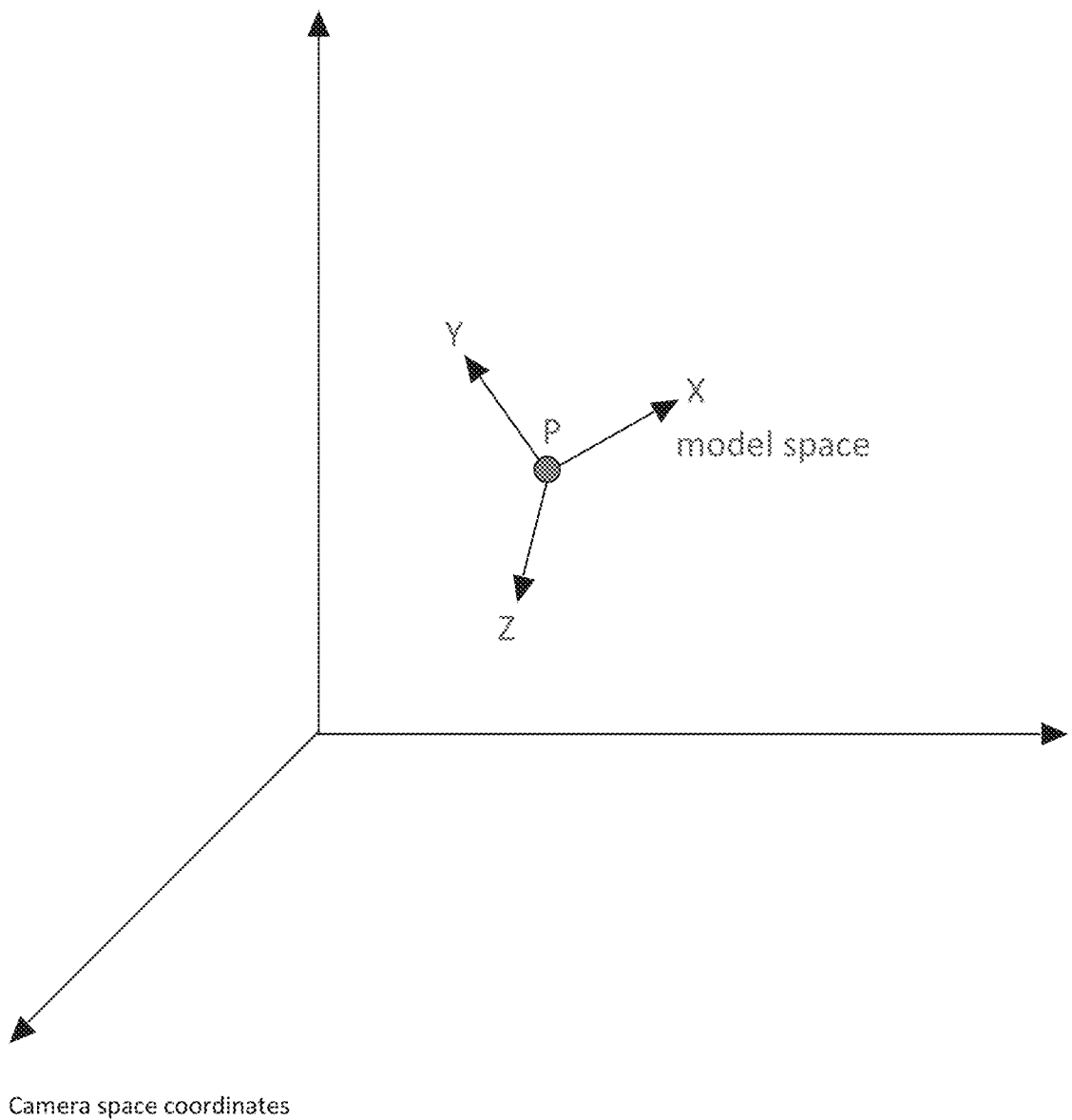
FIG. 6 is a schematic diagram illustrating the relationship between model space and camera space.
Figure 7:
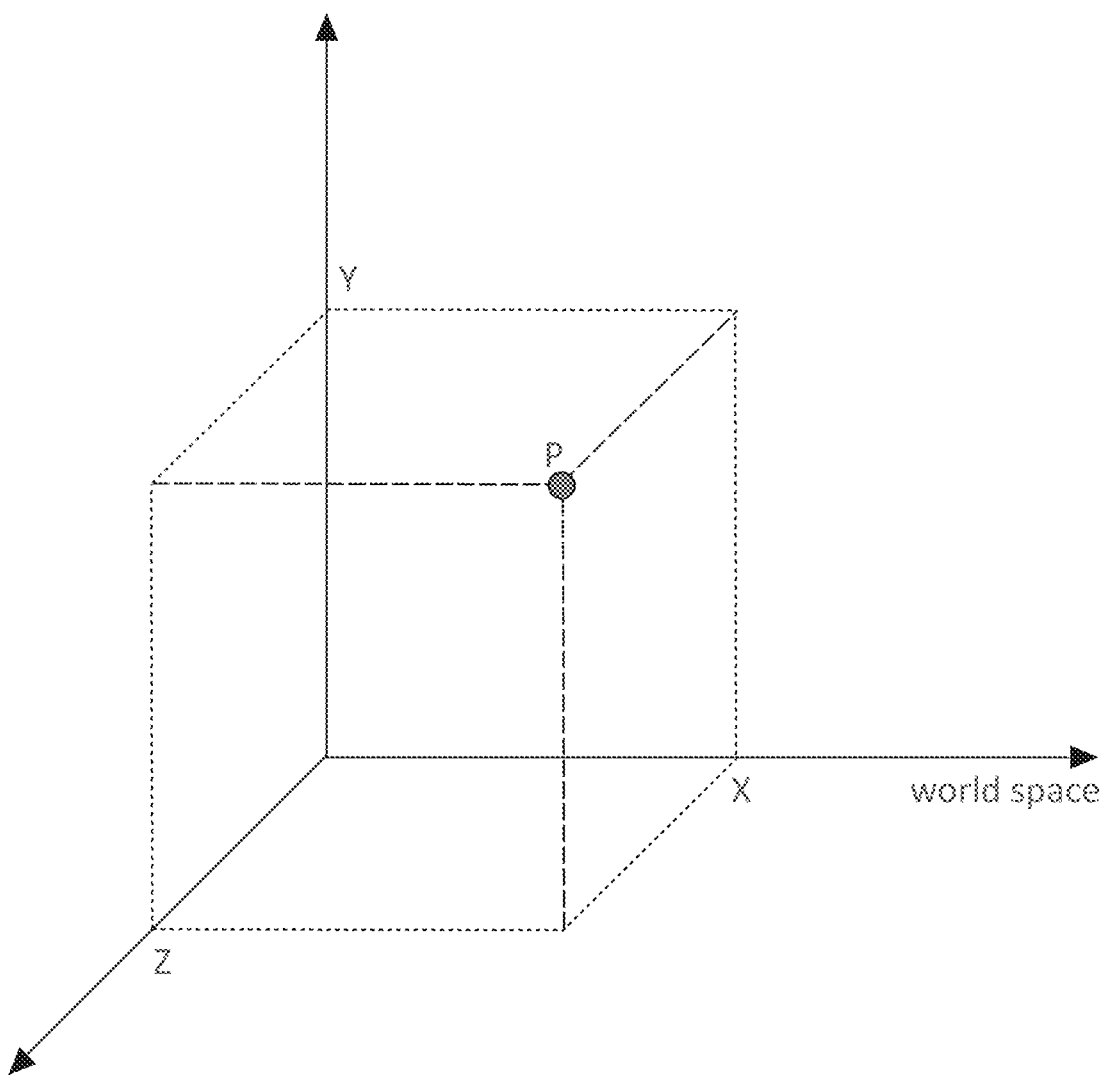
FIG. 7 is a schematic diagram illustrating the relationship between model space and world space.

In the case of rasterisation, the coordinates defining the position of vertices of models for a frame to be rendered must be transformed from model space to camera space. The relationship between model space and camera space coordinates is shown in FIG. 6. In the case of ray tracing, the coordinates defining the position of vertices of models for the frame to be rendered must instead be transformed from model space to a world space. The relationship between model space and world space coordinates is illustrated in FIG. 7.

Figure 8:
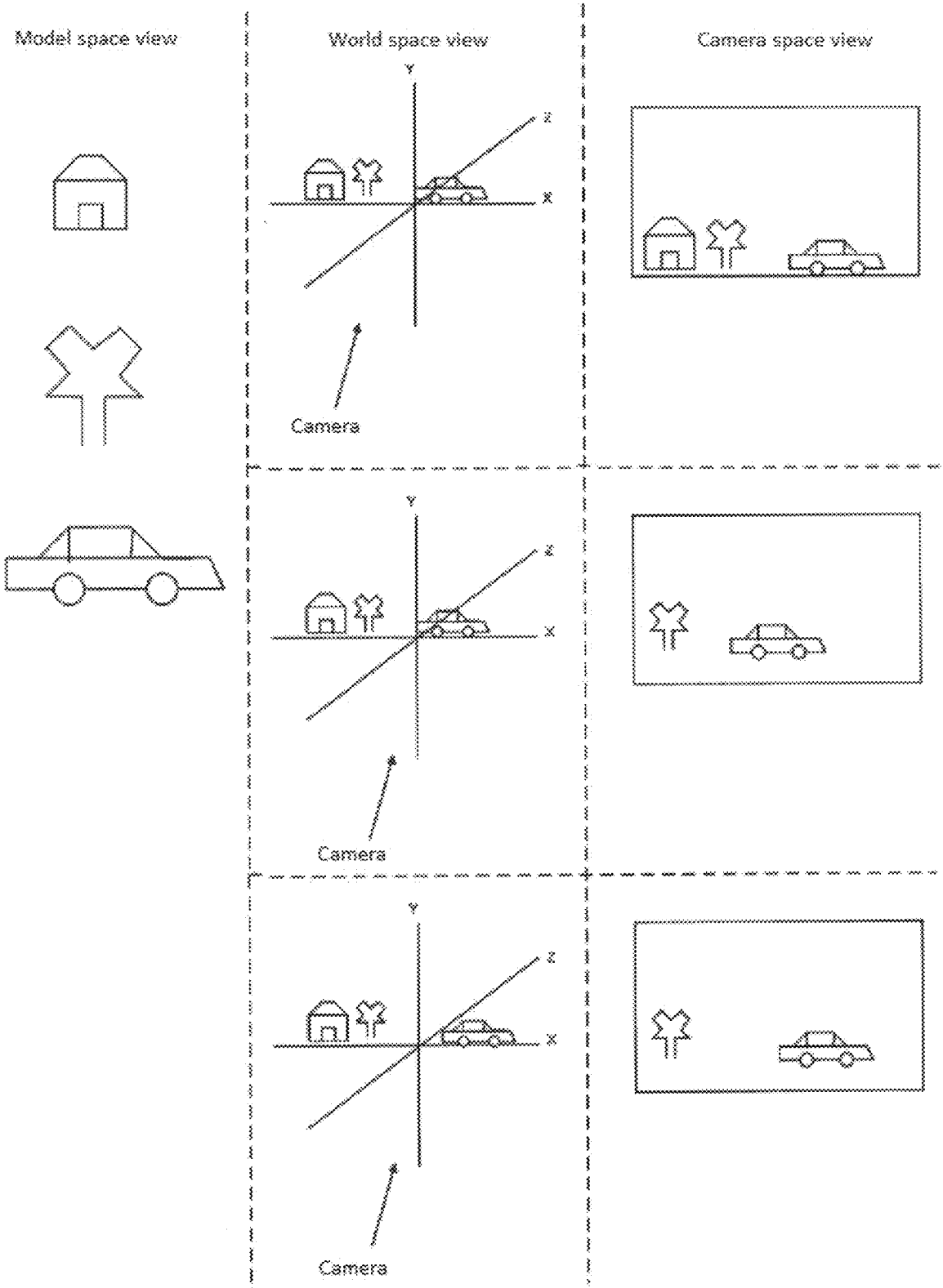
FIG. 8 is a schematic diagram illustrating the relationship between model space, world space and camera space by reference to a scene including a number of objects represented by models.

FIG. 8 illustrates, by reference to certain models for a frame representing objects in a scene (shown as a house, a tree and a car), the relationship between the model space, world space and camera space. The camera space is defined by reference to a viewpoint (referred to as a "camera").

The conversions of model vertex coordinates required for the ray tracing and rasterisation processes of a hybrid ray tracing process are performed by executing an appropriate shader program to perform the necessary coordinate transformations. While the embodiments herein are described by reference to a vertex shader program, it will be appreciated that any type of shader program which may operate to provide the required transformations of position data as part of its operation may be used. For example, a geometry shader program may be used.

The vertex coordinate data of models in camera space and world space required for use in rasterisation and ray tracing respectively may be updated for every frame. However, the Applicant has realised that while it is generally necessary to perform transformation of vertex coordinate data for models from model space to camera space for use in rasterisation for every frame, the transformation of the vertex coordinate data from model space to world space for a model for an object for use in ray tracing a new frame need only be re-done if the object has moved between frames, or if the geometry of the model representing the object has changed between frames. In other words, the transformation to world space can be performed in a conditional manner, based upon movement of the object, or change in the geometry of the model for the object between frames. In contrast, the transformation of model vertex coordinate data to camera space for use in rasterisation should always be performed, regardless of whether movement of the object occurs between frames or whether there is any change in the geometry of the model representing the object. A change in the geometry of a model for an object may involve a change in the primitives and/or vertices defining the object, and may occur where the object modelled by the model changes between frames. For example, the shape and/or appearance of an object might change. This might occur, for example, in the case of a car in the scene, if that car crashes, or where a balloon changes due to the balloon inflating between frames. A change in geometry may also arise if different shader programs are used in different frames. Different shader programs may process the geometry differently.

It will be appreciated that the movement of an object between frames may be known to the driver for the GPU e.g. based upon motion vector data for objects in frames. It is possible to record the identity of individual objects e.g. objects within a frame. For example, such functionality is provided by some modern Application Programming Interfaces (APIs), such as Vulkan. The ability to record the identity of individual objects within a frame correspondingly allows those objects to be tracked as they move from frame to frame. Motion vectors may be derived for the objects.

Likewise, the existence of any change in the geometry of the model for an object between frames may be known to the driver. The driver can analyse the shader programs being used, and determine how it affects the geometry of an object/model. The driver may also detect where a different shader program is used from one frame to another. A driver may keep track of which shader program is being executed and on which objects/models in which frames.

Figure 9:
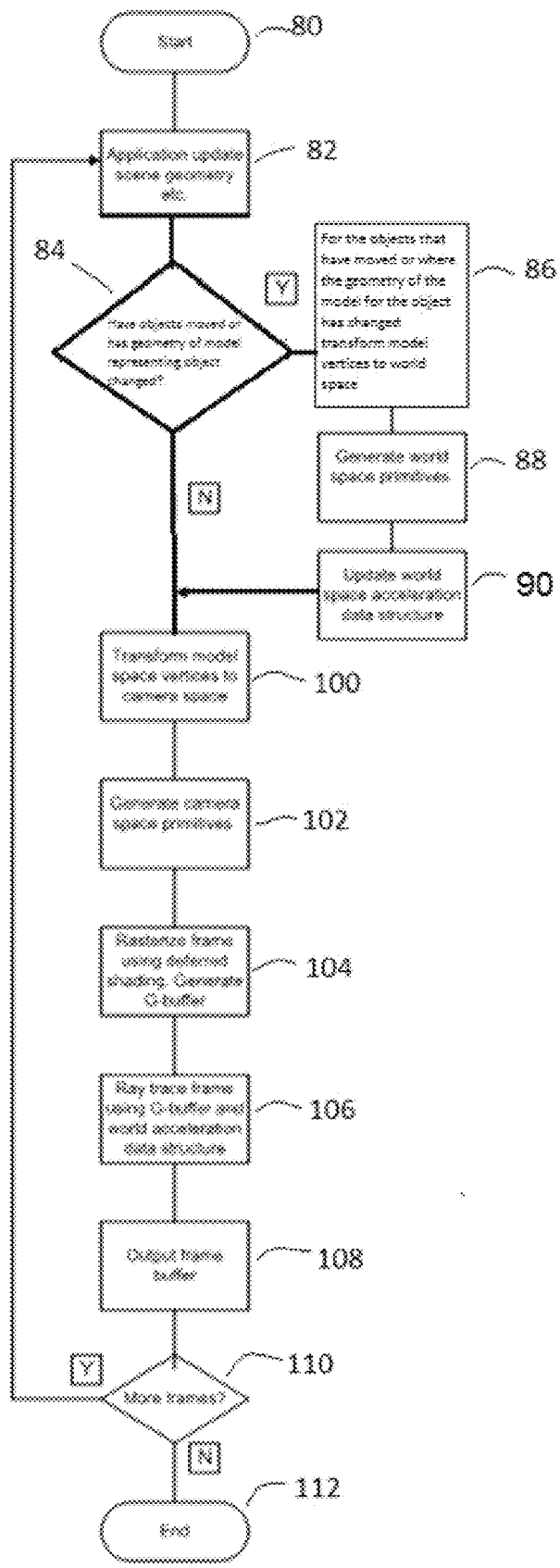
FIG. 9 is a flow chart illustrating one embodiment of a hybrid ray tracing process in accordance with the technology described herein.

FIG. 9 is a flowchart illustrating a hybrid ray tracing rendering process including such conditional transformation of model vertex coordinate data from model space to world space for use in the ray tracing part of the process.

The process starts at step 80. In step 82, the application will provide updated scene geometry, etc., for the next frame to be rendered.

In step 84 it is determined whether any of the objects present in the new frame have moved (relative to the preceding frame), or whether the geometry of any model for an object present in the new frame has changed relative to the preceding frame. The determination of the movement of objects or changes in geometry of models for objects is based upon information already known to the system e.g. driver relating to the movement of objects in the scene and the geometry of the models representing the objects (although it is envisaged that in the case of movement of objects, the determination may also or instead involve detecting whether movement of objects has occurred between frames e.g. by consideration of motion vectors associated with the objects).

For any objects that have moved between frames, or whose geometry has changed between frames, a sub-process is performed, including steps 86, 88, and 90. In step 86 the vertex coordinate data for the models for the objects in model space is transformed to world space for use in the ray tracing process of the hybrid ray tracing process. The transformed coordinate data is used to generate primitives in world space—step 88. In step 90 the generated world space primitives are used to update a world space acceleration data structure. The sub-process including steps 86, 88, 90 then ends, and the main process flow is rejoined prior to step 100.

For any objects that have not moved between frames and where the geometry of the models representing the objects has not changed between frames (after performing step 84), or for any objects that have moved or for which the model representing the object's geometry has changed (after steps 86, 88 and 90 have been performed), the process moves on to step 100, in which vertex coordinate data for the models for the objects is transformed from model space to camera space for use in the rasterisation process of the hybrid ray tracing process. The transformed coordinate data is used to generate primitives in camera space—step 102. Thus, the transformation of vertex coordinate data into camera space occurs for all objects, whether or not they have moved, or the geometry of the models for the objects has changed between frames.

In step 104, the frame is rasterised using a deferred shading method, and a G-buffer generated for use in the ray tracing part of the hybrid ray tracing process.

In step 106, the frame is ray traced using the G-buffer generated in step 104 and the acceleration data structure in world space generated in step 90.

The output data generated is then output to a frame buffer in step 108.

In step 110 it is determined whether there are any further frames to be rendered. If so, the method returns to step 82, and is repeated for the new frame. If not, the method ends—step 112.

In summary, when generating the ray tracing data, the position data for an object may be updated if there is a change in the object between frames, wherein the change includes any one or ones of: the object moves, the geometry of the model for the object changes, or a vertex or geometry shader program causes a change in the coordinates of the object. It may be decided to ignore a change in shader program, or to automatically assume that there has been a change in the geometry of a model for an object if the shader program changes etc. to simplify processing.

The above steps are performed in relation to each object in the frame to be considered, and each instance of an object.

For the case of rasterisation, certain objects (models) may be culled in an initial step, e.g. where the volume of the object (model) is completely outside a view frustrum. Only those objects (models) which are at least potentially within the view frustrum are processed further.

The resulting ray tracing acceleration data structure obtained may include all objects in the "world", or, in some embodiments, a subset of such objects e.g. that form part of a predefined level. The environment may be partitioned so that lighting from one level will have little impact on another level. There may, alternatively be some overlap of geometry between the levels.

One way in which the transformation of model vertex coordinate data to world space and camera space may be achieved in a hybrid ray tracing process of the type illustrated in FIG. 9, and camera and world space primitives and a world space acceleration data structure generated, (i.e. steps 80-102) will now be described by reference to FIG. 10.

Figure 10:
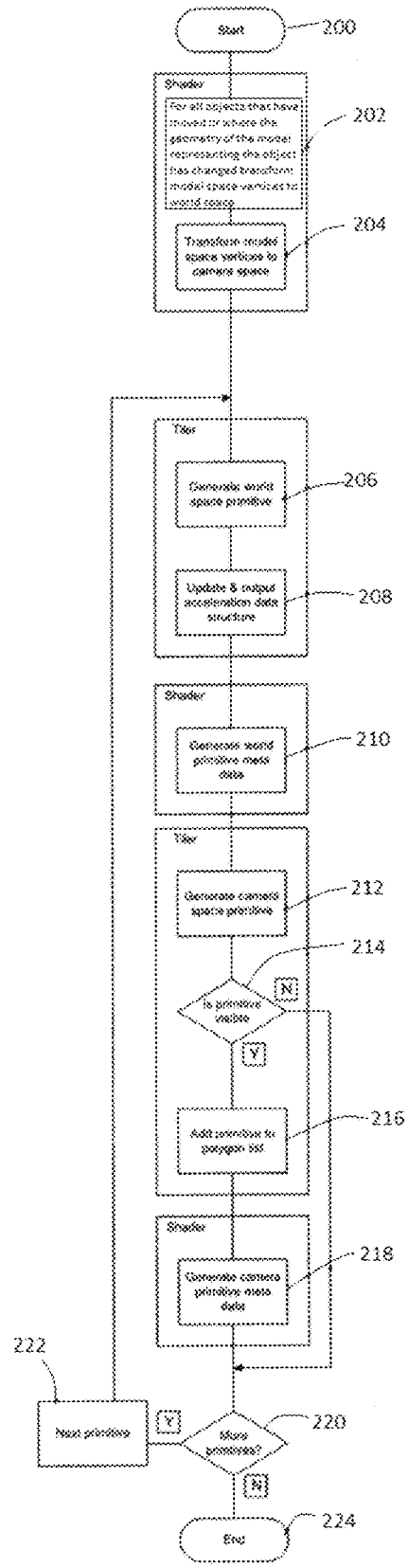
FIG. 10 is a flow chart illustrating certain parts of the embodiment illustrated by reference to FIG. 9 in more detail.

FIG. 10 provides some further detail as to where, and how, in a graphics processing system configured to perform hybrid ray tracing, such steps of the hybrid ray tracing process may be performed.

The process starts at step 200. The transformation of model vertex coordinate data from model space to camera space or world space as required is performed by a vertex shader. As mentioned above, a shader is a programmable processing stage of the graphics processing pipeline that executes shader programs on input data values to generate a desired set of output data for processing by the rest of the graphics pipeline. When rendering a new frame, the vertex shader is arranged to, for all objects that have moved between frames, or where the geometry of the model for the object has changed, (i.e. between the new frame and a preceding frame), transform vertex coordinate data for the models for the objects from model space to world space for use in the ray tracing process—step 202. The shader is also configured to transform vertex coordinate data for all models for objects (whether they have moved or not) from model space to camera space for use in the rasterisation processes—step 204. The transformed vertex coordinate data is used, inter alia, by the tiler and shader to perform various functions set out in the remainder of FIG. 10, as will be described in more detail below.

However, briefly, the transformed vertex coordinate data is passed on to the tiler. The tiler uses the vertex coordinate data in world space for a model (object) to generate data indicative of primitive(s) in world space in step 206 for use in the ray tracing process. The tiler also updates and outputs an acceleration data structure for use in the ray tracing process (step 208). The shader generates non-position attribute data i.e. meta data for the primitive(s) in world space using the primitive data generated by the tiler in world space—step 210. The tiler also uses the vertex coordinate data in camera space of the model to generate data indicative of the primitive(s) in camera space for use in rasterisation, and adds the primitive(s) to an applicable primitive list in respect of a tile or tiles if it is expected to be visible in the render output—steps 212-216. In step 218 the shader uses the primitive data in camera space generated by the tiler to generate non-position attribute data i.e. meta data for the primitive or primitives in camera space if it has been deemed visible. Steps 206-218 are repeated for each primitive indicated by the transformed vertex coordinate data for the frame—steps 220-224.

It will be appreciated that, while in embodiments, for reasons discussed in more detail below, the tiler may generate the primitives and data structures for use in the cases of rasterisation and ray tracing sequentially, as shown in FIGS. 9 and 10, it is envisaged that the tiler could, alternatively, generate such primitives and data structures simultaneously.

Figure 11:
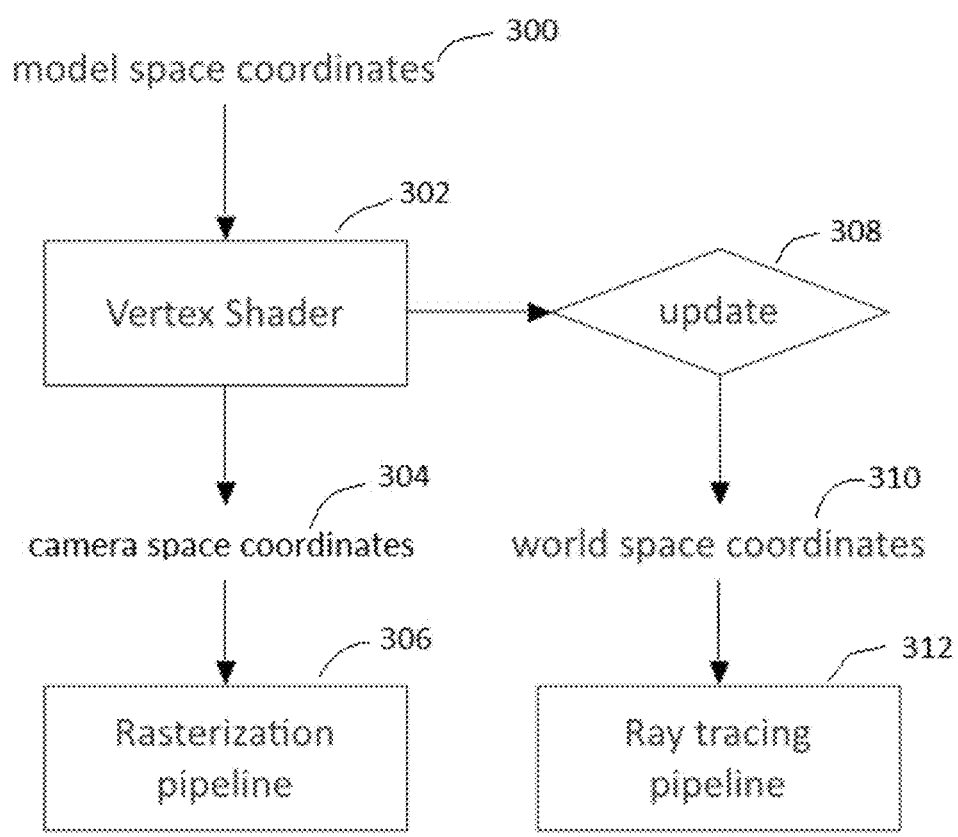
FIG. 11 is a flow chart illustrating one way in which model space coordinates may be transformed to camera space and world space coordinates in accordance with an embodiment of the technology described herein.

FIG. 11 illustrates the basic process for determining model vertex coordinate data used in hybrid ray tracing processes in accordance with embodiments of the technology described herein, such as those exemplified in FIGS. 9 and 10.

Vertex coordinates 300 of models in model space are input to the vertex shader 302. In all cases, the vertex shader transforms the vertex coordinates of models into camera space to provide camera space coordinates 304. These are input to the rasterisation pipeline 306. For any object that has moved or for which the geometry of the model representing the object has changed between frames, the vertex shader 302 also operates on the vertex coordinate data for the model for the object to transform it into world space 308, providing world space coordinates 310. The world space coordinates 310 are then input to the ray tracing pipeline 312. Thus, the world space coordinate data for a model for an object is only updated 308 if the object has moved between frames, or the geometry of the model representing the object has changed between frames, while the camera space coordinate data for a model for an object is updated for every frame.

In one exemplary embodiment, when an object in the new frame to be rendered has not moved between frames and the geometry of the object has not changed, the shader executes a first shading program which causes a first vertex shading operation to be performed. The determination that there is no movement or change in geometry for the object or model representing the object causes the compiler to generate the first shading program and provide the program to the programmable execution unit for execution. In some embodiments, the first and second shader programs may be generated for a first object, or set of objects in a frame e.g. at the start of a "level". The applicable one of the shader programs may then be selected for use in providing vertex shaded data for subsequent objects, or instances of objects, being considered for that level. The first vertex shading operation transforms vertex coordinate data for the models for the objects from model space to camera space for use in the rasterisation process.

When an object in the new frame to be rendered is determined to have moved between frames, or the geometry of the object is determined to have changed, the compiler generates a second shading program and provides it to the programmable execution unit for execution. The second vertex shading program causes a second vertex shading operation to be performed. The second vertex shading operation transforms vertex coordinate data for the models for the objects from model space both to camera space for use in the rasterisation process and to world space for use in the ray tracing process.

The second vertex shading operation may transform the vertex coordinate data from model space directly to camera space and directly to world space. However, in embodiments, the second vertex shading operation transforms the vertex coordinate data in model space first to world space, to provide the world space coordinates for input to the rasterisation pipeline, and then from world space to camera space, to provide the camera space coordinates for input to the rasterisation pipeline. Thus, the world space coordinates for output are provided as an intermediate step in providing the camera space coordinates for output. This may provide a more efficient process for providing the coordinate data.

In the present embodiments, the first and second vertex shading programs as appropriate in the manner of the technology described herein are provided as shader programs to be executed by the (vertex) shader of the graphics processor by the compiler for the shader (as part of the compiling of the shader programs). The compiler may, e.g., run as part of the driver 11 on a host CPU 1 for the graphics processor. (Other arrangements would, of course, be possible.)

In the present embodiments, the compiler is operable to generate the first or second vertex shader program dependent upon whether there has been movement or a change in geometry of an object in a new frame to be rendered, and to provide the generated first or second vertex shader program to the programmable execution unit for execution.

Figure 12:
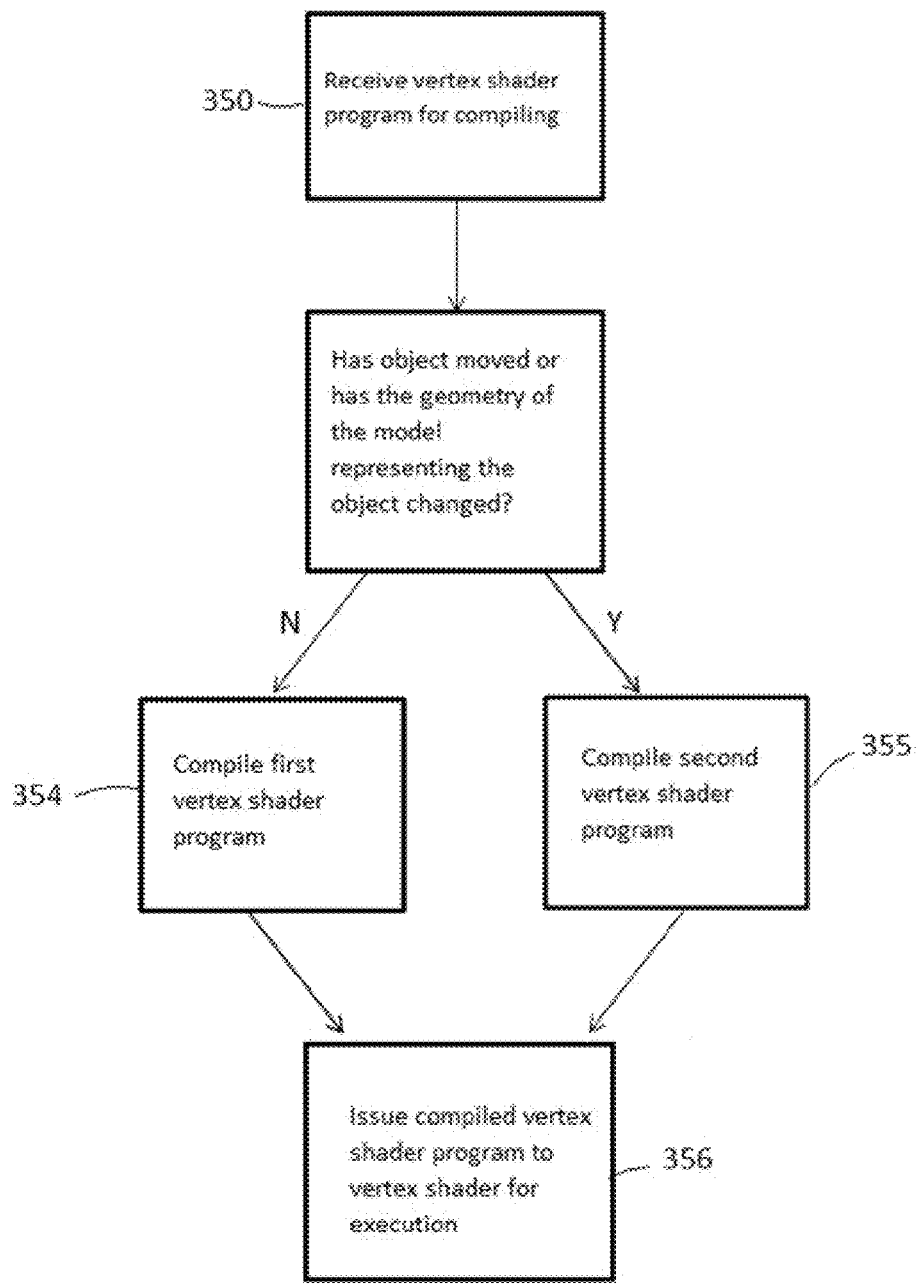
FIG. 12 shows the compiling of a vertex shader program in an embodiment of the technology described herein.

FIG. 12 shows schematically the operation of the compiler in generating a vertex shading program to be used in providing transformed vertex position data for an object being processed in accordance with an embodiment of the technology described herein.

As shown in FIG. 12, the shader compiler will receive a vertex shader program for compiling (step 350).

The compiler will then determine whether an object has moved between frames, or whether there has been a change in its geometry (step 352). This may be based on an indication of that provided by the driver.

When the object has not moved, and there has not been a change in the geometry of the model for the object, the compiler compiles the first vertex shader program to transform vertex position data for the model for the object to camera space for use in rasterisation only (step 354). When the object has moved, or there has been a change in the geometry of the model for the object, the compiler compiles the second vertex shader program to transform vertex position data for the model for the object both to camera space for use in rasterisation and to world space for use in ray tracing (step 355).

The compiled program is then issued to the (vertex) shader for execution (step 356).

The above-discussed transformation of the vertex coordinate data for models for objects from model space to camera space and, where applicable, to world space, may be considered to be an initial vertex shading operation performed in respect of vertex position data. In embodiments of the technology described herein an additional vertex shading operation is performed to process i.e. shade one or more other non-position attributes of each vertex considered. The one or more other attributes may be a varying e.g. defining colour, light, a normal, texture coordinates etc. for the vertex in question.

Returning to FIG. 10, in step 210 the shader generates world primitive meta data in respect of all vertices of a primitive in world space generated by the tiler in step 206. The world primitive meta data comprises non-positional attribute data e.g. varying data for the vertices of the primitive.

In step 212, the tiler uses the vertex coordinate data in camera space to generate the primitive in camera space. In step 214 the tiler identifies whether the primitive should be processed further to generate render output. This is done by performing one or more visibility tests on the primitive, for example view frustrum and/or back-face culling tests.

In step 216, if the primitive is (at least partially) visible, it is included in a primitive list for a tile in a storage of the tiler. If the primitive is not visible, the primitive (and its respective vertices) are not processed further, and the method skips over steps 216 and 218. Thus, such a primitive is not added to a primitive list for a tile for further processing.

In step 218 the shader generates camera primitive meta data in respect of the vertices relating to the primitive if it has been deemed visible in step 214 and added to a primitive list for a tile—step 216. The camera primitive meta data comprises non-positional attribute data e.g. varying data for the vertices of the primitive.

In step 220 it is determined whether there are any further primitives (in world space or camera space) to be considered. If so, the next primitive is considered (step 222), and steps 206-218 are repeated in respect of the next primitive. If there are no more primitives to be considered, the method moves on to step 224 and ends.

It will be seen that while vertex attribute data for primitives in respect of one or more non-position attributes e.g. varyings is generated for all primitives in world space for use in the ray tracing part of the hybrid ray tracing process, vertex attribute data for primitives in respect of one or more non-position attributes e.g. varyings in camera space for use in the rasterisation part of the hybrid ray tracing process is only generated for those primitives which are deemed to be visible. Thus, the generation of non-position vertex attribute data is performed in a conditional manner for vertices of primitives in camera space. The visibility tests are performed by the tiler, which is typically arranged to perform such tests for other purposes.

This may be implemented in various manners.

In some embodiments, execution of a rasterisation additional vertex shading program for providing the additional vertex shading operation i.e. to provide vertex attribute data in respect of the one or more non-position attributes is triggered in respect of the vertices of a primitive generated in camera space in step 212 when that primitive has been found to be visible in step 214. This provides the camera primitive meta data in respect of the vertices of the primitive in step 218. If the primitive is not found to be visible, execution of the rasterisation additional vertex shading program for providing the additional vertex shading operation in respect of the vertices of the primitive is not triggered (step 218 is skipped).

In contrast, execution of a ray tracing additional vertex shading program for providing an additional vertex shading operation i.e. to provide vertex attribute data in respect of the one or more non-position attributes is triggered unconditionally in respect of the vertices of a primitive in world space generated in step 206. Thus, world space primitive meta data in respect of the vertices of a primitive in world space is generated for all primitives in world space considered i.e. step 210 is always performed.

It will be seen that the additional vertex shading required to provide the non-position attribute data for the vertices of world space and camera space primitives may be generated using ray tracing and rasterisation additional vertex shading programs respectively, with the ray tracing additional vertex shading program always being performed, and the rasterisation additional vertex shading program being performed conditionally, only for vertices relating to camera space primitives that have been deemed visible.

In alternative embodiments it is envisaged that rather than using a further vertex shading program to provide the additional vertex shading required to provide the non-position attribute data for the vertices of world space primitives for use in ray tracing, the (initial) vertex shading program which provides the vertex coordinate data in world space for use in the ray tracing process may also provide the vertex attribute data in respect of the one or more non-position attributes. Where first and second vertex shading programs are used to provide the transformed coordinate data in world space, dependent upon whether or not an object has moved or the geometry of the model representing the object has changed, each of the first and second vertex shading programs may be arranged to additionally provide such non-positional attribute data (which may be generated at the same time as, or sequentially to the position data). Execution of a rasterisation additional vertex shading program for providing the additional vertex shading operation in respect of the primitives in camera space may then be conditionally triggered in the manner described above, based upon visibility of primitives.

However, in embodiments the vertex shading program provides the additional vertex shading required to provide non-position attribute data for vertices of world space primitives for use in ray tracing is a separate program, executed after the initial vertex shading program. It has been recognised that the additional vertex attribute data used for ray tracing and rasterisation is likely to be similar, and may advantageously be provided using similar, or even the same additional vertex shading programs, with the additional vertex shading program for rasteriation being triggered conditionally, and that for ray tracing always being executed.

Figure 13:
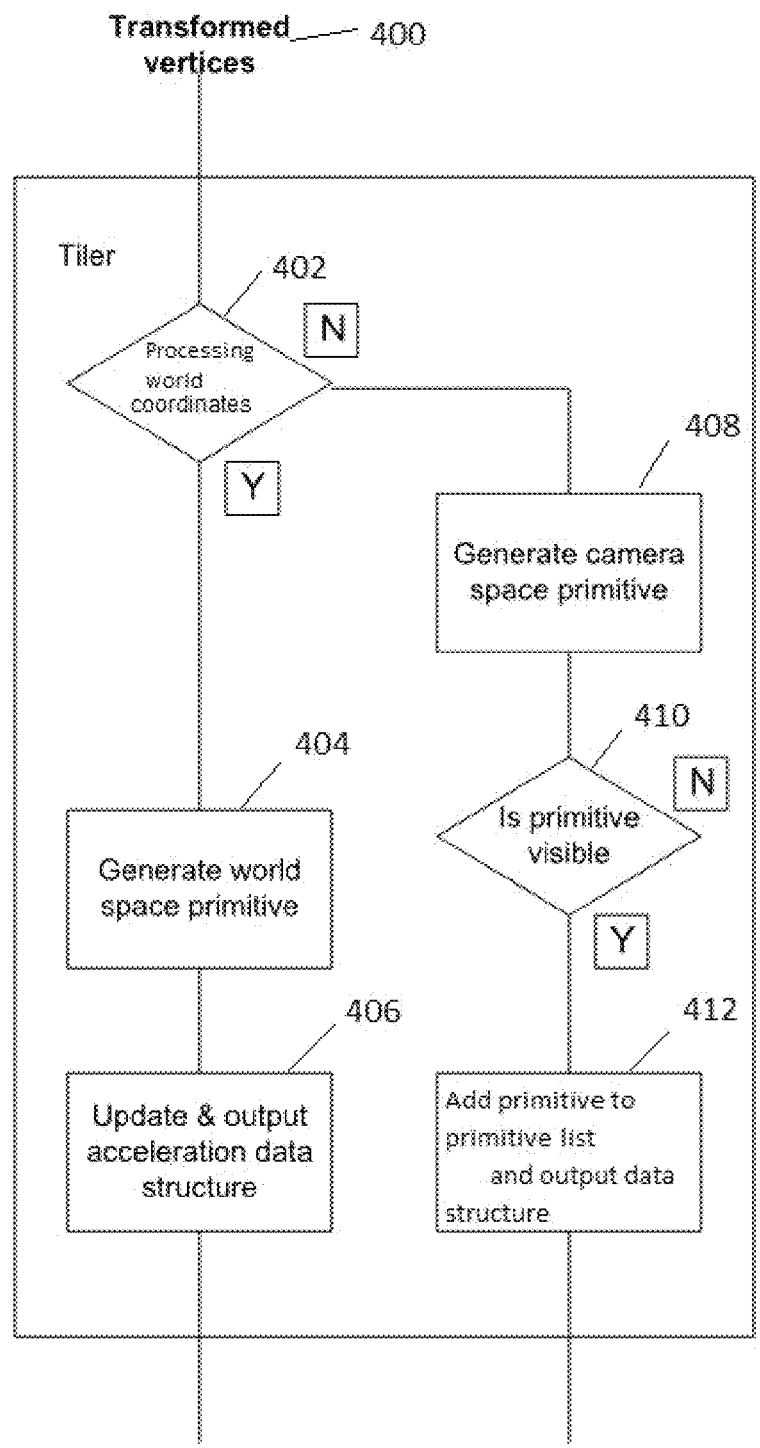
FIG. 13 is a flow chart illustrating the way in which vertex shaded data may be generated for use in rasterisation and ray tracing processes of a hybrid ray tracing process in accordance with one embodiment of the technology described herein.

FIG. 13 illustrates one method by which the tiler may operate to implement a method as described in FIG. 10.

The tiler operates on transformed vertex data 400 for models for objects obtained from steps 202 and 204 of FIG. 10. In step 402 it is determined whether the coordinates of a model for an object being processed are world coordinates. If so, the tiler goes on to generate a world space primitive—step 404, and then updates and outputs an acceleration data structure for use in ray tracing—step 406. If not i.e. if the coordinates of a model being processed are camera space coordinates, the process moves from step 403 on to step 408 in which a camera space primitive is generated. In step 410 it is then determined whether the primitive is visible. If so, in step 412 the primitive is added to a primitive list for a tile, and the tile list output for use in rasterisation. If not, the primitive is not processed further.

Figure 14:
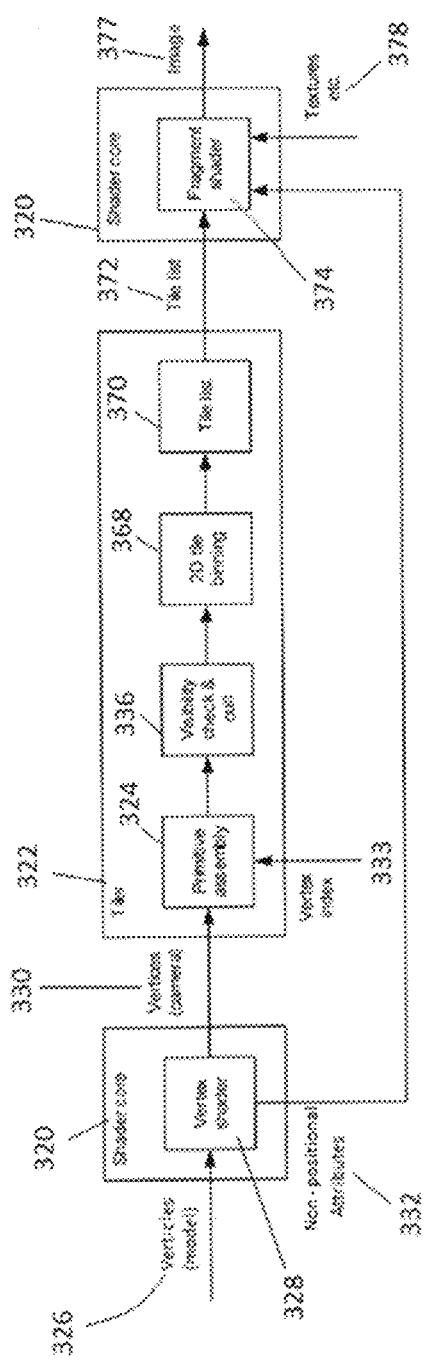
FIG. 14 illustrates certain parts of the operation of a graphics processor in accordance with an embodiment of the technology described herein, with particular reference to the tiler.
Figure 15:
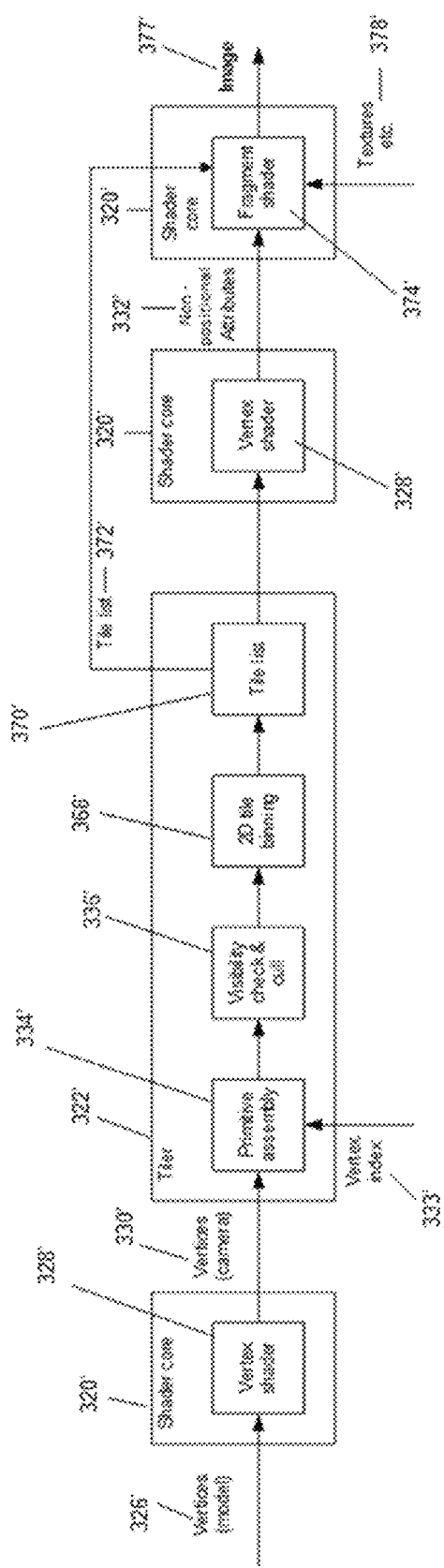
FIG. 15 illustrates certain parts of the operation of a graphics processor, with particular reference to the tiler.

FIGS. 14 and 15 illustrate the conditional generation of vertex attribute data for attributes other than position for use in the rasterisation process in more detail.

FIG. 14 illustrates, for reference, the way in which the shader and tiler may operate if the non-positional vertex attribute data for a model for an object is generated in a non-conditional manner.

Vertices 326 of models in model space are input to a vertex shader 328 of a shader core 320. The vertex shader generates transformed vertex coordinate data in camera space 330 and inputs this to the tiler 322. The tiler performs primitive assembly—step 334 (based on the vertex data in camera space and vertex index data 333), visibility checking and culling of non-visible primitives—step 336, 2D tile binning—step 368 and tile list generation—step 370. The generated tile lists 372 are input to the fragment shader 374 of the shader core 320, and used to generate image data 377. The image data 377 is generated by the fragment shader based on non-positional attribute data 332, (which is provided non-conditionally for all vertices for which transformed position data is generated by the vertex shader), and texture data etc.—378.

Referring to FIG. 15, the modifications of the shader and tiler system illustrated in FIG. 14 to implement conditional generation of non-positional attribute data for vertices for use in rasterisation will be described. Each component in this embodiment is referred to by the corresponding reference numeral used in FIG. 14, but annotated with a "'" sign. The differences between the FIGS. 14 and 15 arrangements will now be described.

In the embodiment of FIG. 15 the vertex shader 328' initially only generates transformed vertex position data i.e. coordinates 330', and no vertex attribute data in respect of attributes other than position. The tiler operates in the same manner as described in the FIG. 14 embodiment to generate a tile list. The tile list 372' is provided as input to the fragment shader 374' as before. However, this time the tile list is also provided as input to the vertex shader 328'. The vertex shader 328' generates non-positional attribute data for the vertices of primitives included in the tile list and inputs this to the fragment shader 374'. The tile list only includes those tiles deemed to be visible following the visibility check and cull process. Thus, in this embodiment, non-positional attribute data 332' is generated only in respect of vertices of primitives identified for further processing, as a result of the visibility check and cull test.

It will be seen that the tiler described in relation to FIGS. 9-15 is operable not only to generate data structures for use in rasterisation, but also to generate data structures for use in the ray tracing process of a hybrid ray tracing process. In particular, in addition to generating primitive lists for each tile, the tiler is able to generate an acceleration data structure for use in the ray tracing process. The modifications to a tiler usable in rasterisation to enable functioning in this manner to additionally generate data structures for use in ray tracing will now be described.

In a tile based graphics processor, the tiler is configured to fetch vertex coordinate data in camera space, assemble primitives, perform visibility checks and generate and output primitive lists (indicating the primitives included in each tile).

Figure 16:
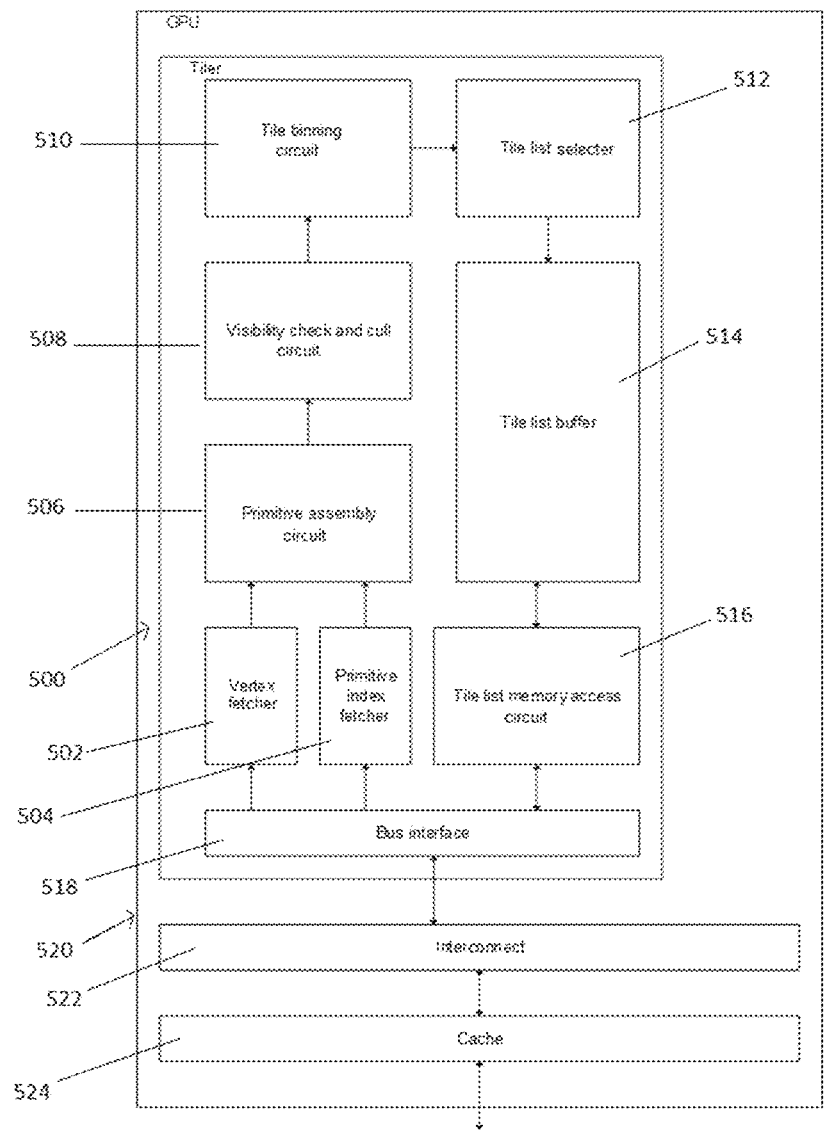
FIG. 16 illustrates the operation of a tiler to generate primitive lists for tiles for use in a rasterisation based process.

Referring to FIG. 16, the tiler 500 includes a vertex fetcher 502 which fetches vertex coordinate data for the vertices of primitives transformed into camera space from the shader. The primitives may be referred to as 3D perspective transformed primitives. The tiler also includes a primitive index fetcher 504 which receives a list of vertices defining the primitives of the draw call. The vertex coordinate data for the primitives in camera space and the primitive index data is passed on to the primitive assembly circuit 506, where the primitives are built for further processing. The primitives are then subjected to a visibility check to determine whether they are visible in the render output, and any primitive deemed to be invisible in the render output is culled, and not subjected to further processing. These functions are performed by the visibility check and cull unit 508. For example view frustrum and/or back-face culling tests may be performed. When binning tiles in camera space, three dimensions are considered. A simple test may determine whether a Z dimension is behind the camera or too far away such that it may be ignored. The binning process may then just consider the X and Y dimensions of the primitive to determine whether it fits within a viewing frustrum. A back face culling check may also be performed.

Primitives deemed to be visible are then subjected to a tile binning process by the tile binning circuit 510, to assign them to a tile or tiles. The tile list selecter 512 then selects the tile list(s) to which each primitive is to be added i.e. the list(s) of primitives for the tile(s) to which the primitive has been assigned by the tile binning circuit. The tile list buffer 514 stores the tile lists for each tile. Tile list memory access circuit 516 provides access to tile list data stored in the tile list buffer 514.

The tiler 500 communicates via a bus interface 518, an interconnect 522 and a cache 524 of the GPU with appropriate memory for the GPU 520.

Figure 17:
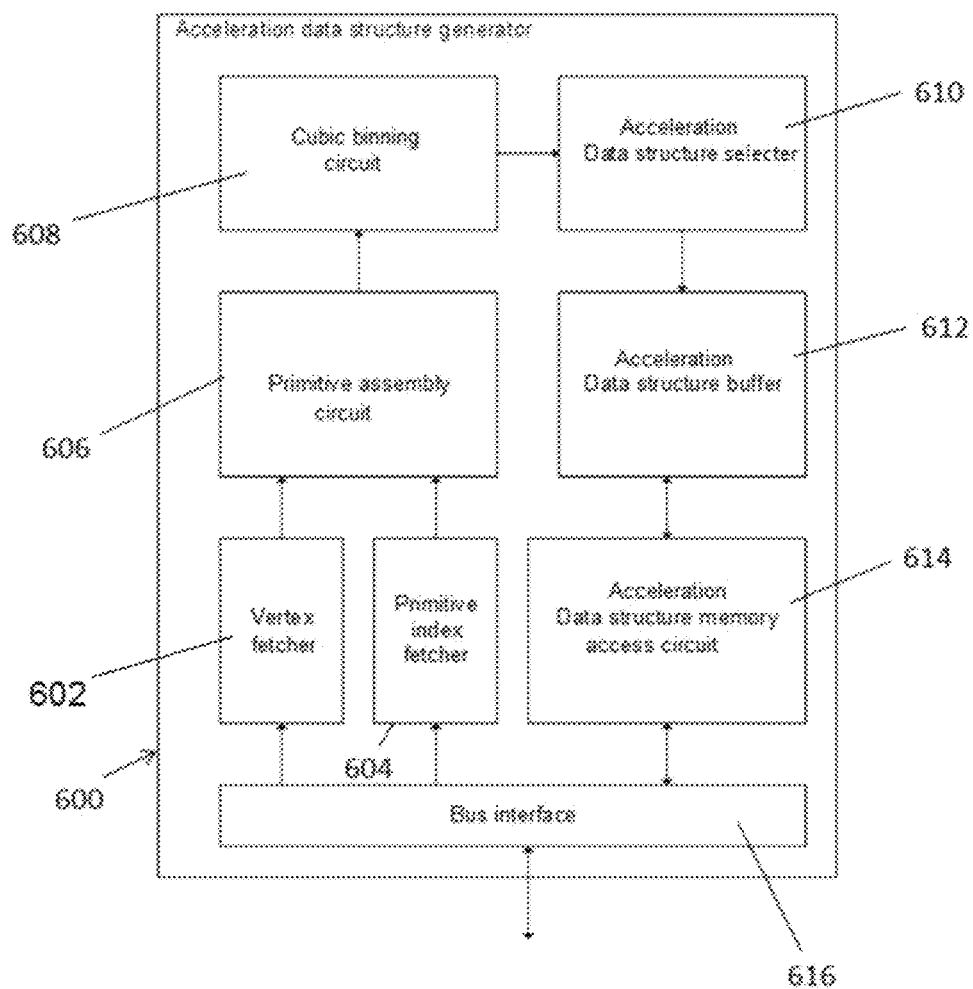
FIG. 17 illustrates the operation of an acceleration data structure generator for generating a data structure for use in a ray tracing process.

FIG. 17 illustrates a system 600 configured to generate acceleration data structures, such as BVH trees, for use in ray tracing. The system includes a vertex fetcher 602 which fetches vertex coordinate data for the vertices of primitives transformed into world space from the shader. The system also includes a primitive index fetcher 604 which receives a list of vertices defining the primitives of the draw call. The vertex coordinate data for the primitives in world space and the primitive index data is passed on to the primitive assembly circuit 606, where the primitives are built for further processing.

Primitives are then subjected to a 3-dimensional cubic binning process by the 3D cubic binning circuit 608 to compare axis aligned bounding volumes to primitive positions. This enables the data structure selector 610 to arrange the primitives into lists in respect of respective ones of a plurality of axes aligned bounding volumes (AABVs). The resulting acceleration data structure is then stored in the data structure buffer 612. Data structure memory access circuit 614 provides access to the data structure buffer 612. A bus interface 616 enables the acceleration data structure generator to communicate with the rest of the GPU.

The Applicant has realised that much of the functionality of a tiler for rasterisation as shown in FIG. 16 is required by an acceleration data structure generator for use in ray tracing as shown in FIG. 17.

All functionality required when performing ray tracing is also required when performing rasterisation.

In particular, the following functionality is required by an acceleration data structure generator and also when performing rasterisation;
 vertex fetching
 primitive assembly list tracking list buffering list output However, visibility checking of primitives is required only when performing rasterisation, and not when performing ray tracing.

In accordance with embodiments of the technology described herein, a tiler for rasterisation as shown in FIG. 16 is enhanced to enable it to additionally perform the functions described by reference to FIG. 17, and thus generate data structures for use in ray tracing i.e. acceleration data structures such as BVH trees. For ease of reference, the case in which the enhanced tiler produces data structures in the form of a tile list for rasterisation and a BVH tree for use in ray tracing will be described. However, it will be appreciated that the data structures generated for ray tracing and/or rasterisation may differ from these examples.

The enhanced tiler may be arranged to generate data structures for use in rasterisation and ray tracing e.g. a tile list and BVH tree simultaneously. However, as this may require a relatively large tile buffer, in an embodiment the data structures are generated sequentially (as is shown in the example of FIGS. 9 and 10).

Figure 18:
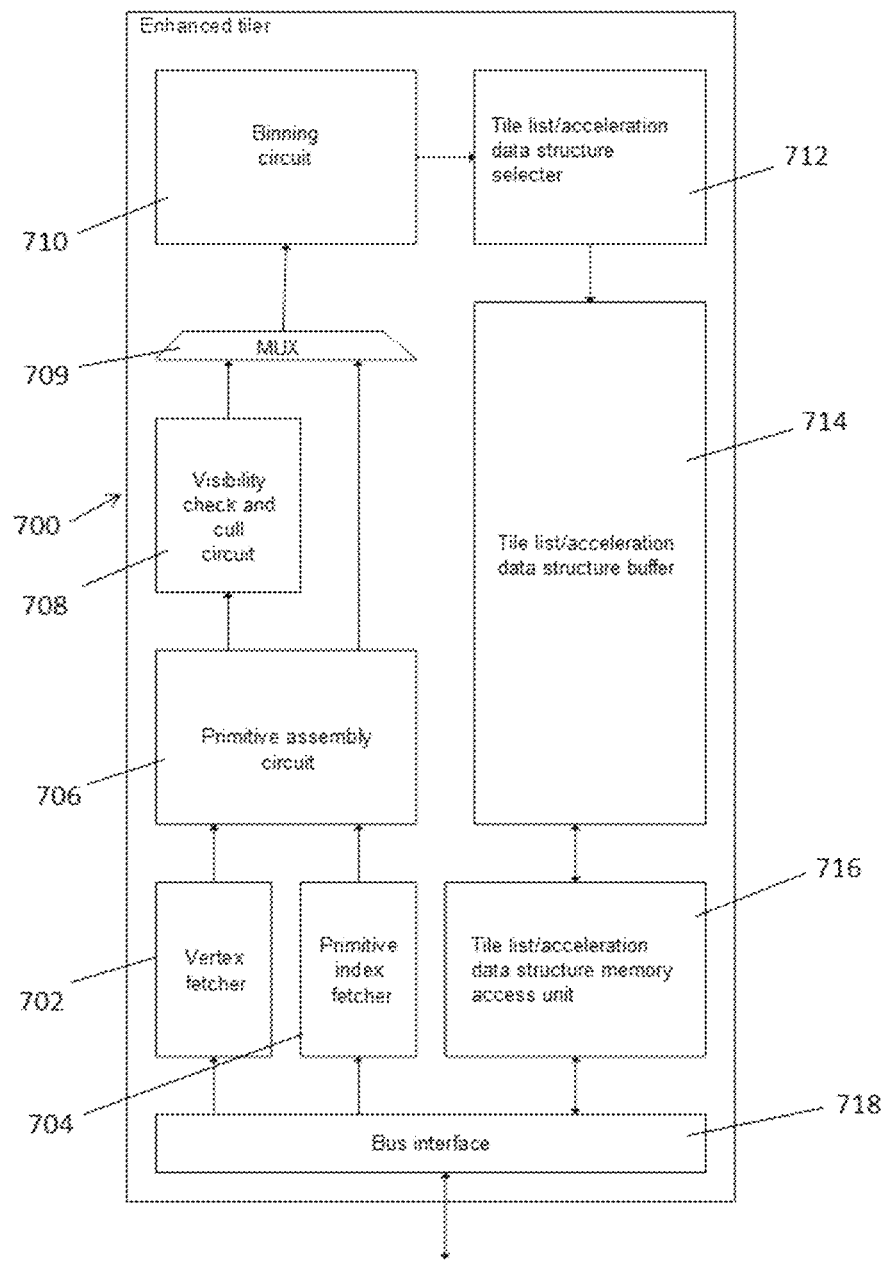
FIG. 18 illustrates the operation of a tiler in accordance with an embodiment of the technology described herein.

FIG. 18 illustrates an enhanced tiler 700 able to provide tile lists for rasterisation and acceleration data structures for ray tracing.

The enhanced tiler 700 includes a vertex fetcher 702 for fetching vertex coordinate data for primitives in camera space and world space from the shader. A primitive index fetcher 704 receives a list of indices of primitives forming part of the draw call. The vertex coordinate data for the primitives in world space and camera space, and the primitive index data, is passed on to the primitive assembly circuit 706, where the primitives are built in world space and camera space for further processing.

The visibility check and cull circuit 708 performs visibility checking of primitives in camera space for use in the rasterisation process, and culls any primitives deemed invisible, such that they are not subjected to further processing. The outputs of the visibility check and cull circuit 708 and the primitive assembly circuit 706 are input via a multiplexer 709 to the binning circuit 701. Thus, primitives in world space, and those primitives in camera space which have not been culled are passed on to the binning circuit 710.

The binning circuit is able to perform binning of primitives in camera space to assign them to tiles, and binning of primitives in world space to assign the primitives to axis aligned bounding volumes. The results of the binning processes performed by the circuit are passed on to the tile list/acceleration data structure selector 712, which generates tile lists for use in rasterisation based on the results of the binning, and acceleration data structures e.g. BVH tree structures, for use in ray tracing based on the results of the binning process.

The tile lists and acceleration data structures are stored in the tile list/acceleration data structure buffer 714. Tile list/acceleration data structure memory access unit 416 is able to access tile list or acceleration data structure information stored in the tile list/acceleration data structure buffer.

A bus interface 718 is provided which communicates with the vertex fetcher 702, primitive index fetcher 704 and tile list/acceleration data structure memory access circuit 716, and provides an interface to the GPU via a suitable arrangement e.g. as shown in FIG. 16.

The acceleration data structures generated by the tiler for use in the ray tracing processes described in relation to any of the embodiments of the technology described herein may be indicative of the geometry of a scene to be rendered i.e. the new frame being rendered. For example, the acceleration data structures may be of the type described by reference to FIG. 4. However, the principles described in relation to obtaining such acceleration data structure relating to the geometry of a scene may be applied to obtaining other types of data structure e.g. acceleration data structure, including those which may be generated to provide information in relation to non-positional attribute information relating to objects in a scene.

It will be appreciated that FIGS. 9 and 10 illustrate a number of sub-processes which may be particularly advantageous when performed in relation to a hybrid ray tracing process, and may enable such a process to be optimised. Such sub-processes include: the generation of transformed positional data in world space for use in ray tracing processes in a conditional manner, dependent upon whether an object has moved or the geometry of the object changed (as described by reference to FIGS. 11 and 12); the conditional triggering of the generation of non-positional attribute data for vertices of primitives in camera space for use in rasterisation (as described by reference to FIGS. 13-15); and finally, the enhancement of a tiler to produce data structures for use both in ray tracing and rasterisation processes (as described by reference to FIGS. 16-18). These sub-processes are advantageous in their own right, and need not be performed in combination with one another. Any one or ones of these sub-processes may be performed alone, or in combination with any one or ones of the other sub-processes. Furthermore, the enhanced tiler may be performed in the context of full ray tracing processes, and is not limited in utility to hybrid ray tracing processes.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of operating a graphics processing system when rendering a new frame in a sequence of frames to be rendered in which each frame represents a view of a scene comprising one or more objects and is defined as including one or more models defining objects in the scene, and in which each frame is rendered using a hybrid ray tracing process that uses both rasterisation and ray tracing processes, and in which each model for a frame to be rendered is defined in a model space, and the vertex position data relating to the model defined in the model space is transformed to a camera space with respect to a viewpoint for use in a rasterisation process of the hybrid ray tracing process and to a world space for use in a ray tracing process of the hybrid ray tracing process;

the graphics processing system comprising a graphics processor comprising a programmable execution unit configured to perform vertex shading operations on vertex attribute data including vertex position data for vertices relating to models for a frame to be rendered;

the method comprising:

when an object to be rendered for the new frame has not moved relative to a previous frame and when the geometry of the model representing the object has not changed relative to the previous frame:
  generating a first shading program which, when executed by the programmable execution unit, causes a first vertex shading operation to be performed, the first vertex shading operation transforming position data for vertices relating to the model representing the object from model space to camera space for use in a rasterisation process of the hybrid ray tracing rendering process;
  providing the generated first shading program to the programmable execution unit for execution by the programmable execution unit; and
  the programmable execution unit executing the first shading program to transform position data for the vertices relating to the model representing the object from model space to camera space for use in a rasterisation process of the hybrid ray tracing rendering process when rendering the new frame;
when an object to be rendered for the new frame has moved relative to a previous frame or the geometry of the model representing the object has changed relative to the previous frame:
  generating a second shading program which, when executed by the programmable execution unit, causes a second vertex shading operation to be performed, the second vertex shading operation transforming position data for vertices relating to the model representing the object from model space both to a camera space for use in a rasterisation process of the hybrid ray tracing rendering process and to a world space for use in a ray tracing process of the hybrid ray tracing rendering process;
  providing the generated second shading program to the programmable execution unit for execution by the programmable execution unit; and
  the programmable execution unit executing the second shading program to transform position data for vertices relating to the model representing the object from model space both to a camera space for use in a rasterisation process of the hybrid ray tracing rendering process and to a world space for use in a ray tracing process of the hybrid ray tracing rendering process when rendering the new frame.

2. The method of claim 1 wherein the second shading program comprises a shading program configured to transform the position data for the vertices relating to the model from model space to world space, and to output the transformed position data in world space for use in the ray tracing process of the hybrid ray tracing process, and to then further transform the transformed position data for the vertices relating to the model in world space to camera space, and to output the further transformed position data in camera space for use in the rasterisation process of the hybrid ray tracing process.

3. The method of claim 1 wherein, for a vertex or vertices relating to the model and having at least one attribute other than position, the method comprises;
  when generating vertex-shaded attribute data for use in the ray tracing process of the hybrid ray tracing process, performing additional vertex shading processing for at least one attribute other than position to generate vertex shaded attribute data for the vertex or vertices of the model in respect of the at least one other attribute of the vertex or vertices;
  and, when generating vertex-shaded attribute data for use in the rasterisation process of the hybrid ray tracing process, determining whether the vertex or vertices of the model in question should be processed further, using, at least in part, some or all of the vertex shaded position data in camera space generated for use in the rasterisation process in respect of the vertex or vertices by the first or second vertex shading operation as appropriate, and performing an additional vertex shading operation on a vertex or vertices that it has been determined should be processed further, wherein performing the additional vertex shading operation comprises performing vertex shading processing for at least one attribute other than position for the vertex or vertices in question to generate vertex shaded attribute data for the vertex or vertices in question in respect of the at least one other attribute of the vertex or vertices.

4. A method of operating a graphics processing system that comprises a graphics processor comprising a programmable execution unit configured to execute programs to perform vertex shading operations on vertex attribute data to generate vertex-shaded attribute data for use in a hybrid ray tracing rendering process including both rasterisation and ray tracing processes;
  the method comprising:
  for a set of vertices to be processed by the graphic processing system, the or each vertex having a plurality of attributes:
  performing an initial vertex shading operation on one or more vertices of the set of vertices, wherein the initial vertex shading operation comprises performing, for the one or more vertices of the set, vertex shading processing for at least one attribute of the one or more vertices of the set but not for at least one other attribute of the vertex or vertices in question to generate vertex shaded attribute data for the at least one attribute of the vertex or vertices;
  and, when generating vertex-shaded attribute data for use in the ray tracing process of the hybrid ray tracing process, performing an additional vertex shading operation on the vertex or vertices in question, wherein the additional vertex shading operation comprises performing additional vertex shading processing for at least other vertex attribute of the plurality of vertex attributes belonging to the vertex or vertices in question to generate vertex shaded attribute data for the at least one other attribute of the vertex or vertices;
  and, when generating vertex-shaded attribute data for use in the rasterisation process of the hybrid ray tracing process, determining whether the vertex or vertices in question should be processed further, using, at least in part, some or all of the vertex shaded attribute data for the at least one attribute generated by the initial vertex shading operation, and performing an additional vertex shading operation on a vertex or vertices that it has been determined should be processed further, wherein the additional vertex shading operation comprises performing additional vertex shading processing for at least one other vertex attribute of the vertex attributes belonging to the vertex in question, to generate vertex shaded attribute data for at least one other attribute of the vertex or vertices.

5. The method of claim 4 wherein:
the graphics processor is a tile-based graphics processor in which the render output of the graphics processor is divided into a plurality of tiles for rendering purposes; and
the method further comprises operating the tiler to arrange primitives to be processed by the graphics processing system into primitive lists for tiles that the render target output of the graphics processor has been divided into for rendering purposes, and outputting the primitive lists for use in the rasterisation process of the hybrid rendering process,
wherein the tiler is additionally configured to generate one or more data structures for use in the ray tracing process of the hybrid ray tracing process, and the method further comprises operating the tiler to generate one or more such data structures, and outputting the one or more data structures for use in the ray tracing process of the hybrid ray tracing process.

6. The method of claim 5, wherein the ray-tracing data structure is indicative of the distribution of objects in a scene.

7. The method of claim 5 wherein the tiler comprises a visibility checking circuit for determining, when arranging primitives into primitive lists for use in the rasterisation process, whether a primitive is potentially visible in the output being generated, wherein the method comprises disabling the visibility checking circuit when the tiler is being used to generate the one or more data structures for use in a ray tracing process.

8. A graphics processing system operable to render frames in a sequence of frames to be rendered in which each frame represents a view of a scene comprising one or more objects and is defined as including one or more models defining objects in the scene, and in which each frame is rendered using a hybrid ray tracing process that uses both rasterisation and ray tracing processes, and in which each model for a frame to be rendered is defined in a model space, and the vertex position data relating to the model defined in the model space is transformed to a camera space with respect to a viewpoint for use in a rasterisation process of the hybrid ray tracing process and to a world space for use in a ray tracing process of the hybrid ray tracing process;
the graphics processing system comprising:
a graphics processor comprising a programmable execution unit configured to perform vertex shading operations on vertex attribute data including vertex position data for vertices relating to models for a frame to be rendered;
the graphics processing system further comprising:
a processing circuit configured to:
when an object to be rendered for a new frame has not moved relative to a previous frame and when the geometry of the model representing the object has not changed relative to the previous frame:
generate a first shading program which, when executed by the programmable execution unit, causes a first vertex shading operation to be performed, the first vertex shading operation transforming position data for vertices relating to the model representing the object from model space to camera space for use in a rasterisation process of the hybrid ray tracing rendering process; and
when an object to be rendered for a new frame has moved relative to a previous frame or the geometry of the model representing the object has changed relative to the previous frame:
generate a second shading program which, when executed by the programmable execution unit, causes a second vertex shading operation to be performed, the second vertex shading operation transforming position data for vertices relating to the model representing the object from model space both to a camera space for use in a rasterisation process of the hybrid ray tracing rendering process and to a world space for use in a ray tracing process of the hybrid ray tracing rendering process;
and to:
provide the generated first or second shading program to the programmable execution unit for execution by the programmable execution unit; and
the programmable execution unit is configured to:
execute the provided first shading program to transform position data for the vertices relating to the model representing the object from model space to camera space for use in a rasterisation process of the hybrid ray tracing rendering process when rendering the new frame, or the provided second shading program to transform position data for vertices relating to the model representing the object from model space both to a camera space for use in a rasterisation process of the hybrid ray tracing rendering process and to a world space for use in a ray tracing process of the hybrid ray tracing rendering process when rendering the new frame.

9. The system of claim 8 wherein the second shading program comprises a shading program configured to transform the position data for the vertices relating to the model from model space to world space, and to output the transformed position data in world space for use in the ray tracing process of the hybrid ray tracing process, and to then further transform the transformed position data for the vertices relating to the model in world space to camera space, and to output the further transformed position data in camera space for use in the rasterisation process of the hybrid ray tracing process.

10. The system of claim 9, wherein the graphics processor is a tile-based graphics processor, and comprises:
a tiler that is configured to arrange primitives to be processed by the graphics processor in primitive lists for respective tiles that the render output of the graphics processor has been divided into for rendering purposes, and to output the primitive lists for use in a rasterisation process;
wherein the tiler is additionally configured to generate one or more data structures for use in a ray tracing process, and to output the one or more data structures for use in a ray tracing process.

11. The system of claim 10 wherein the tiler comprises a primitive arranger configured to assign primitives to respective ones of regions that the render output of the graphics processor has been divided into for rendering purposes for providing primitive lists for use in the rasterisation process, and wherein the primitive arranger is additionally configured to assign primitives to respective ones of a plurality of bounding volumes in order to generate the data structure for use in ray tracing.

12. The system of claim 10, wherein the tiler comprises a visibility checking circuit for determining whether a primitive is potentially visible in the output being generated, wherein the visibility checking circuit is disabled when the tiler is being used to generate the one or more data structures for use in a ray tracing process.

13. The system of claim 8, wherein the graphics processor is configured to, for a vertex or vertices relating to a model and having at least one attribute other than position:
when generating vertex-shaded attribute data for use in the ray tracing process of the hybrid ray tracing process, perform additional vertex shading processing for at least one attribute other than position to generate vertex shaded attribute data for the vertex or vertices of the model in respect of the at least one other attribute of the vertex or vertices;

and, when generating vertex-shaded attribute data for use in the rasterisation process of the hybrid ray tracing process, determine whether the vertex or vertices of the model in question should be processed further, using, at least in part, some or all of the vertex shaded position data in camera space generated for use in the rasterisation process in respect of the vertex or vertices by the first or second vertex shading operation as appropriate, and perform an additional vertex shading operation on a vertex or vertices that it has been determined should be processed further, wherein performing the additional vertex shading operation comprises performing vertex shading processing for at least one attribute other than position for the vertex or vertices in question to generate vertex shaded attribute data for the vertex or vertices in question in respect of the at least one other attribute of the vertex or vertices.

14. A method of compiling a shading program to be executed by a programmable execution unit of a graphics processor when rendering a new frame in a sequence of frames to be rendered in which each frame represents a view of a scene comprising one or more objects and is defined as including one or more models defining objects in the scene, and in which each frame is rendered using a hybrid ray tracing process that uses both rasterisation and ray tracing processes, and in which each model for a frame to be rendered is defined in a model space, and the vertex position data relating to the model defined in the model space is transformed to a camera space with respect to a viewpoint for use in a rasterisation process of the hybrid ray tracing process and to a world space for use in a ray tracing process of the hybrid ray tracing process;

the method comprising:
when an object to be rendered for a new frame has not moved relative to a previous frame and when the geometry of the model representing the object has not changed relative to the previous frame:
generating a first shading program which, when executed by a programmable execution unit of a graphics processor, causes a first vertex shading operation to be performed, the first vertex shading operation transforming position data for vertices relating to the model representing the object from model space to camera space for use in a rasterisation process of a hybrid ray tracing rendering process;

and
when an object to be rendered for a new frame has moved relative to a previous frame or the geometry of the model representing the object has changed relative to the previous frame:
generating a second shading program which, when executed by a programmable execution unit of a graphics processor, causes a second vertex shading operation to be performed, the second vertex shading operation transforming position data for vertices relating to the model representing the object from model space both to a camera space for use in a rasterisation process of a hybrid ray tracing rendering process and to a world space for use in a ray tracing process of the hybrid ray tracing rendering process.

* * * * *